United States Patent
Oshiro

(10) Patent No.: US 9,262,260 B2
(45) Date of Patent: Feb. 16, 2016

(54) INFORMATION PROCESSING APPARATUS, INFORMATION PROCESSING METHOD, AND RECORDING MEDIUM

(71) Applicant: FUJITSU LIMITED, Kawasaki (JP)

(72) Inventor: Yasumasa Oshiro, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 13/958,062

(22) Filed: Aug. 2, 2013

(65) Prior Publication Data

US 2014/0089744 A1    Mar. 27, 2014

(30) Foreign Application Priority Data

Sep. 27, 2012  (JP) .................................. 2012-214134

(51) Int. Cl.
| | |
|---|---|
| G06F 11/00 | (2006.01) |
| G06F 11/08 | (2006.01) |
| G06F 11/34 | (2006.01) |
| G06F 11/20 | (2006.01) |
| G06F 11/30 | (2006.01) |

(52) U.S. Cl.
CPC ............ *G06F 11/08* (2013.01); *G06F 11/2094* (2013.01); *G06F 11/3476* (2013.01); *G06F 11/3006* (2013.01); *G06F 2201/86* (2013.01)

(58) Field of Classification Search
USPC .......................................................... 714/48
See application file for complete search history.

(56) References Cited

U.S. PATENT DOCUMENTS

| | | | | |
|---|---|---|---|---|
| 5,349,674 | A  * | 9/1994 | Calvert et al. | 709/227 |
| 6,101,180 | A  * | 8/2000 | Donahue et al. | 370/352 |
| 6,487,513 | B1 * | 11/2002 | Eastvold et al. | 702/108 |
| 2006/0085697 | A1 * | 4/2006 | Takeuchi et al. | 714/50 |
| 2006/0224930 | A1 * | 10/2006 | Bantz et al. | 714/48 |
| 2009/0094478 | A1 * | 4/2009 | Harper et al. | 714/3 |
| 2010/0057667 | A1 * | 3/2010 | Gotoh et al. | 706/59 |
| 2011/0154091 | A1 * | 6/2011 | Walton et al. | 714/2 |
| 2011/0271145 | A1 * | 11/2011 | Silberstein | 714/18 |
| 2011/0320884 | A1 * | 12/2011 | Thilagar et al. | 714/48 |
| 2013/0151909 | A1 * | 6/2013 | Kikuchi | 714/54 |

FOREIGN PATENT DOCUMENTS

| | | |
|---|---|---|
| JP | 2007-18131 | 1/2007 |
| JP | 2008-198123 | 8/2008 |
| JP | 2009-110318 | 5/2009 |
| WO | WO 2010/024133 A1 | 3/2010 |

* cited by examiner

*Primary Examiner* — Kamini Patel

(74) *Attorney, Agent, or Firm* — Staas & Halsey LLP

(57) ABSTRACT

An information processing apparatus includes: a storage including storage areas individually allocated to processing operations, and is configured to store therein association information in which a content of a failure occurring in one processing operation of the processing operations and at least one storage area of the storage areas are associated with each other wherein history information indicating histories of the individual processing operations is stored in the individual storage areas in response to the execution of the processing operations; and a processor coupled to the storage and configured to duplicate, in a storage area different from the storage areas, history information stored in a storage area where a failure having occurred and a matching content of a failure are associated with each other in the association information when the failure has occurred in one processing operation of the processing operations.

17 Claims, 18 Drawing Sheets

FIG. 4

| TIME AND DATE | ID | CONTENT |
|---|---|---|
| ... | ... | ... |
| 2012-02-19 12:28 | CL010 | CONNECTION TO BUSINESS DATABASE HAS SUCCEEDED |
| 2012-02-19 12:28 | CL011 | COLLECTION OF EVENT FROM BUSINESS DATABASE HAS SUCCEEDED |
| 2012-02-19 13:28 | CL020 | CONNECTION TO BUSINESS DATABASE HAS FAILED |

| TIME AND DATE | ID | CONTENT |
|---|---|---|
| ... | ... | ... |
| 2012-02-19 12:28 | NT010 | RECEPTION OF EVENT HAS SUCCEEDED |

| TIME AND DATE | ID | CONTENT |
|---|---|---|
| ... | ... | ... |
| 2012-02-19 12:28 | RG010 | CONNECTION TO EVENT DATABASE HAS SUCCEEDED |
| 2012-02-19 12:28 | RG011 | EVENT STORAGE FOR EVENT DATABASE HAS SUCCEEDED |

| TIME AND DATE | ID | CONTENT |
|---|---|---|
| ... | ... | ... |
| 2012-02-19 12:28 | ST010 | CONNECTION TO EVENT DATABASE HAS SUCCEEDED |
| 2012-02-19 12:28 | ST011 | ACQUISITION OF EVENT FROM EVENT DATABASE HAS SUCCEEDED |
| 2012-02-19 12:28 | ST012 | TOTALIZATION PROCESSING HAS SUCCEEDED |

| TIME AND DATE | ID | CONTENT |
|---|---|---|
| ... | ... | ... |
| 2012-02-19 12:30 | AM010 | CONNECTION TO EVENT DATABASE HAS SUCCEEDED |
| 2012-02-19 12:32 | AM011 | SEARCH FOR EVENT WITHIN EVENT DATABASE HAS SUCCEEDED |
| 2012-02-19 13:30 | AM020 | CONNECTION TO EVENT DATABASE HAS SUCCEEDED |
| 2012-02-19 13:32 | AM021 | SEARCH FOR EVENT WITHIN EVENT DATABASE HAS FAILED |

{[SEARCH_ERROR]=>1}, [DATETIME]+-300, ${BPMA_HOME}/log/bpmeventcollection.log;
${BPMA_HOME}/log/notification.log;
${BPMA_HOME}/log/bpmeventregistration.log;
${BPMA_HOME}/log/statistics.log;
${BPMA_HOME}/log/activitymonitor.log

| TIME AND DATE | ID | CONTENT |
|---|---|---|
| 2012-02-19 13:28 | CL020 | CONNECTION TO BUSINESS DATABASE HAS FAILED |
| 2012-02-19 13:30 | AM020 | CONNECTION TO EVENT DATABASE HAS SUCCEEDED |
| 2012-02-19 13:32 | AM021 | SEARCH FOR EVENT WITHIN EVENT DATABASE HAS FAILED |

| TIME AND DATE | ID | CONTENT |
|---|---|---|
| ... | ... | ... |
| 2012-02-19 12:28 | CL010 | CONNECTION TO BUSINESS DATABASE HAS SUCCEEDED |
| 2012-02-19 12:28 | CL011 | COLLECTION OF EVENT FROM BUSINESS DATABASE HAS SUCCEEDED |
| 2012-02-19 13:28 | CL020 | CONNECTION TO BUSINESS DATABASE HAS SUCCEEDED |
| 2012-02-19 13:28 | CL021 | COLLECTION OF EVENT FROM BUSINESS DATABASE HAS SUCCEEDED |

| TIME AND DATE | ID | CONTENT |
|---|---|---|
| ... | ... | ... |
| 2012-02-19 12:28 | NT010 | RECEPTION OF EVENT HAS SUCCEEDED |
| 2012-02-19 13:28 | NT020 | RECEPTION OF EVENT HAS SUCCEEDED |

| TIME AND DATE | ID | CONTENT |
|---|---|---|
| ... | ... | ... |
| 2012-02-19 12:28 | RG010 | CONNECTION TO EVENT DATABASE HAS SUCCEEDED |
| 2012-02-19 12:28 | RG011 | EVENT STORAGE FOR EVENT DATABASE HAS SUCCEEDED |
| 2012-02-19 13:28 | RG020 | CONNECTION TO EVENT DATABASE HAS FAILED |

| TIME AND DATE | ID | CONTENT |
|---|---|---|
| ... | ... | ... |
| 2012-02-19 12:30 | AM010 | CONNECTION TO EVENT DATABASE HAS SUCCEEDED |
| 2012-02-19 12:32 | AM011 | SEARCH FOR EVENT WITHIN EVENT DATABASE HAS SUCCEEDED |
| 2012-02-19 13:30 | AM020 | CONNECTION TO EVENT DATABASE HAS FAILED |
| 2012-02-19 13:32 | AM021 | SEARCH FOR EVENT WITHIN EVENT DATABASE HAS FAILED |

| TIME AND DATE | ID | CONTENT |
|---|---|---|
| 2012-02-19 13:28 | CL020 | CONNECTION TO BUSINESS DATABASE HAS SUCCEEDED |
| 2012-02-19 13:28 | CL021 | COLLECTION OF EVENT FROM BUSINESS DATABASE HAS SUCCEEDED |
| 2012-02-19 13:28 | NT020 | RECEPTION OF EVENT HAS SUCCEEDED |
| 2012-02-19 13:28 | RG020 | CONNECTION TO EVENT DATABASE HAS FAILED |
| 2012-02-19 13:30 | AM020 | CONNECTION TO EVENT DATABASE HAS FAILED |
| 2012-02-19 13:32 | AM021 | SEARCH FOR EVENT WITHIN EVENT DATABASE HAS FAILED |

{[STATISTICS_ERROR]=>1}, [DATETIME]+-300, ${BPMA_HOME}/log/bpmeventcollection.log;
${BPMA_HOME}/log/notification.log;
${BPMA_HOME}/log/bpmeventregistration.log;
${BPMA_HOME}/log/statistics.log;

INFORMATION PROCESSING APPARATUS, INFORMATION PROCESSING METHOD, AND RECORDING MEDIUM

CROSS-REFERENCE TO RELATED APPLICATION

This application is based upon and claims the benefit of priority of the prior Japanese Patent Application No. 2012-214134, filed on Sep. 27, 2012, the entire contents of which are incorporated herein by reference.

FIELD

The embodiments discussed herein are related to an information processing apparatus, an information processing method, and a recording medium.

BACKGROUND

An information processing apparatus sequentially executes a plurality of processing operations, and outputs history information (hereinafter, arbitrarily described as a log) indicating a history of an executed processing operation with respect to each processing operation. In addition, the information processing apparatus stores each log output with respect to each processing operation, in a log file of the processing operation.

When a failure has occurred in the execution of a processing operation, the administrator of the information processing apparatus analyzes the above-mentioned log of the processing operation, and performs the analysis of a failure cause (also referred to as the analysis of a failure occurrence cause). Therefore, various types of technique have been proposed that contribute to the analysis of a failure cause. For example, a device has been proposed that is capable of generating a detection rule capable of detecting an event in which a failure has occurred, in a system including a plurality of components executing information processing operations.

However, if not having understood a dependency relationship between components in advance, it may be difficult for a device capable of creating such a detection rule to create such a detection rule. Therefore, when not having understood the dependency relationship between components, it may be difficult for such a device to create such a detection rule, and as a result, it may be difficult for such a device to provide information useful for the analysis of a failure cause.

In addition, when the size of a log file has exceeded a predetermined size, the information processing apparatus deletes the oldest stored log from logs in the log file, and causes the size of the log file to be less than or equal to a predetermined size (also called log storage of a cyclic method). Accordingly, in a case where a time from when a failure occurs till when the administrator analyzes a failure cause is long, in some cases a log desired for the analysis of the failure cause is deleted from logs in the log file before the administrator performs the analysis, in the information processing apparatus. As a result, it may be difficult for the administrator to analyze the failure cause.

In addition, in some cases, the administrator analyzes a failure cause by analyzing a plurality of log files. When a large number of log files serving as analysis targets exist, the administrator is desired to analyze a large number of log files, and it takes the administrator a long time to analyze the failure cause.

As the related art, there have been Japanese Laid-open Patent Publication No. 2007-18131, Japanese Laid-open Patent Publication No. 2008-198123, Japanese Laid-open Patent Publication No. 2009-110318, and International Publication Pamphlet No. WO 2010-024133.

SUMMARY

According to an aspect of the invention, an information processing apparatus includes a storage and a processor. The storage includes a plurality of storage areas individually allocated to a plurality of processing operations, and is configured to store therein association information in which a content of a failure occurring in one processing operation of the plural processing operations and at least one storage area of the plural storage areas are associated with each other wherein history information indicating histories of the individual processing operations is stored in the individual plural storage areas in response to the execution of the plural processing operations. The processor is coupled to the storage and is configured to duplicate, in a storage area different from the plural storage areas, history information stored in a storage area where a failure having occurred and a matching content of a failure are associated with each other in the association information when the failure has occurred in one processing operation of the plural processing operations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a collection log file;

FIG. 5 is a diagram illustrating an example of a reception log file;

FIG. 6 is a diagram illustrating an example of a storage log file;

FIG. 7 is a diagram illustrating an example of a totalization log;

FIG. 8 is a diagram illustrating an example of a search log file;

FIG. 9 is a diagram illustrating an example of a definition file in FIG. 2;

FIG. 10 is a diagram illustrating an example of a saving log file in FIG. 2;

FIG. 13 is a diagram illustrating another example of the collection log file;

FIG. 14 is a diagram illustrating another example of the reception log file;

FIG. 15 is a diagram illustrating another example of the storage log file;

FIG. 16 is a diagram illustrating another example of the search log file;

FIG. 17 is a diagram illustrating another example of the saving log file in FIG. 2; and FIG. 18 is a diagram illustrating another example of the definition file in FIG. 2.

DESCRIPTION OF EMBODIMENTS (System)

Figure 1:
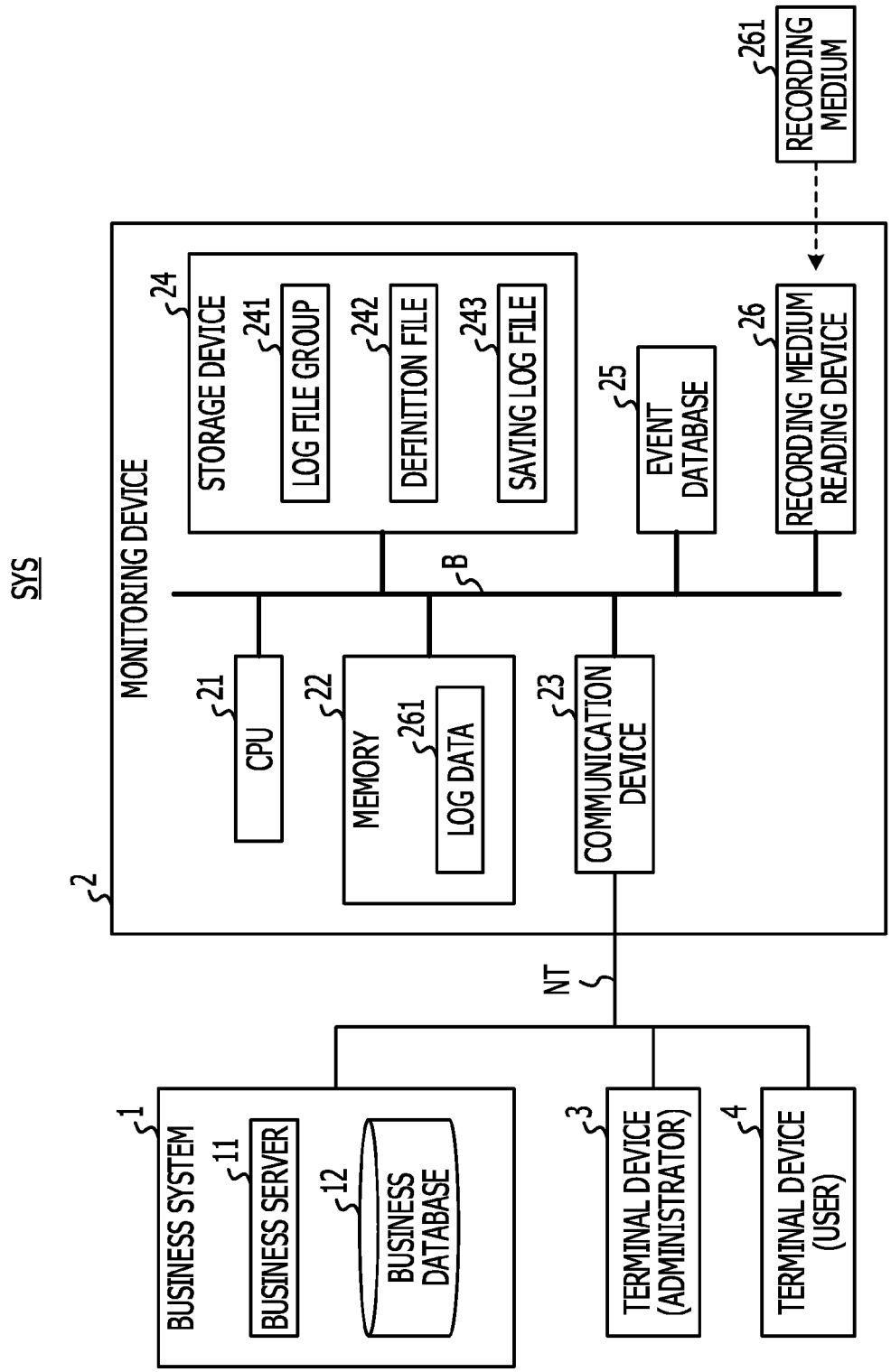
FIG. 1 is a hardware block diagram explaining a whole system in the present embodiment.

FIG. 1 is a hardware block diagram explaining a whole system SYS in the present embodiment. In addition, in the following description, the same symbol will be assigned to the same element, and the description thereof will be arbitrarily omitted.

The whole system SYS includes a business system 1, a monitoring device 2, a terminal device (administrator) 3, and a terminal device (user) 4, which are connected to a network NT. The network NT is, for example, a local area network (LAN).

The business system 1 is a business system executing (also called managing) business processing, and is, for example, an stock management system executing stock management processing or a home delivery service cargo management system executing home delivery service cargo management processing. The business system 1 includes a business server 11 and a business database 12, which are connected through an internal network (not illustrated).

The business server 11 collects business data the business system 1 processes, and transmits the business data to the business database 12.

The business database 12 receives and stores therein the business data transmitted from the business server 11. The business server 11 manages the content of the business data in a unit of one record. In the following description, business data in a unit of the above-mentioned one record will be arbitrarily described as an event. In response to an event transmission request from the monitoring device 2, the business database 12 acquires stored business data, in units of events, and transmits the acquired event to the monitoring device 2.

When the business system 1 is, for example, the stock management system, the above-mentioned event includes the name of a commercial product a shop has and the quantity of stock of this commercial product in this shop at a time and date. In addition, in the following description, it is assumed that the time and date includes a year, a month, a day, an hour, a minute. Specifically, the event is that the quantity of stock of a stock commercial product name AAA in a shop X at the time and date of "2012-02-19 12:21" is 300.

When the business system 1 is the stock management system, the business server 11 collects business data using, for example, a point of sale (POS) system. In the case of the above-mentioned example, the business server 11 collects business data including data indicating that the quantity of stock of the stock commercial product name AAA in the shop X at the time and date of "2012-02-19 12:21" is 300, and stores, in the business database 12, the business data as one event. In the present embodiment, as the business system 1, the stock management system will be exemplified and described.

The monitoring device 2 monitors the implementation status or actual performance of a business content, and provides information it takes for the administrator of the business system to perform business process management (BPM).

For example, by sequentially monitoring various kinds of numerical values of the event of the business data, the monitoring device 2 executes processing for visualizing a latest business status. As the above-mentioned visualizing, the monitoring device 2 totalizes the various kinds of numerical values of the event, graphically illustrates the various kinds of numerical values of the event in a temporal sequence, and outputs a change content in the temporal sequence of the various kinds of numerical value, to the terminal device 4 of the user of the monitoring device 2. The user of the monitoring device 2 is also the administrator of the business system. In addition to this, the monitoring device 2 executes alerting processing where key performance indicators (KPIs) are set for various events occurring on a business process and monitoring is automated. As the above-mentioned alerting processing, the monitoring device 2 compares a numerical value serving as a monitoring target with the threshold value of this numerical value, and outputs an alert to the terminal device 4 of the user, on the basis of this comparison result.

The monitoring device 2 includes a central processing unit (CPU) 21, a memory 22, a communication device 23, a storage device 24, an event database 25, and a recording medium reading device 26, which are connected to one another through, for example, a bus B. In addition, the storage device 24 is also called a storage mechanism.

The CPU 21 is a computer (control unit) controlling the whole monitoring device 2. The memory 22 temporarily stores therein data processed in various kinds of information processing the CPU 21 executes and various kinds of programs. Furthermore, the memory 22 temporarily stores therein, as log data 221, logs the after-mentioned various kinds of programs output. The log is also called history information indicating the history of processing.

The communication device 23 is, for example, a network interface card (NIC), connected to the network NT, and communicates with various kinds of devices connected to this network NT. The storage device 24 is, for example, a magnetic storage device such as a hard disk drive (HDD), or a non-volatile memory. The storage device 24 stores therein a log file group 241 to be described in FIG. 4 to FIG. 8, a definition file 242 to be described in FIG. 9, and a saving log file 243 to be described in FIG. 10. In addition, the monitoring device 2 may not store the log file group 241, the definition file 242, and the saving log file 243 in one storage device, and may also individually store these files (241 to 243) in different storages. In other words, the monitoring device 2 may also include a first storage device storing therein the log file group 241, a second storage device storing therein the definition file 242, and a third storage device storing therein the saving log file 243.

Figure 2:
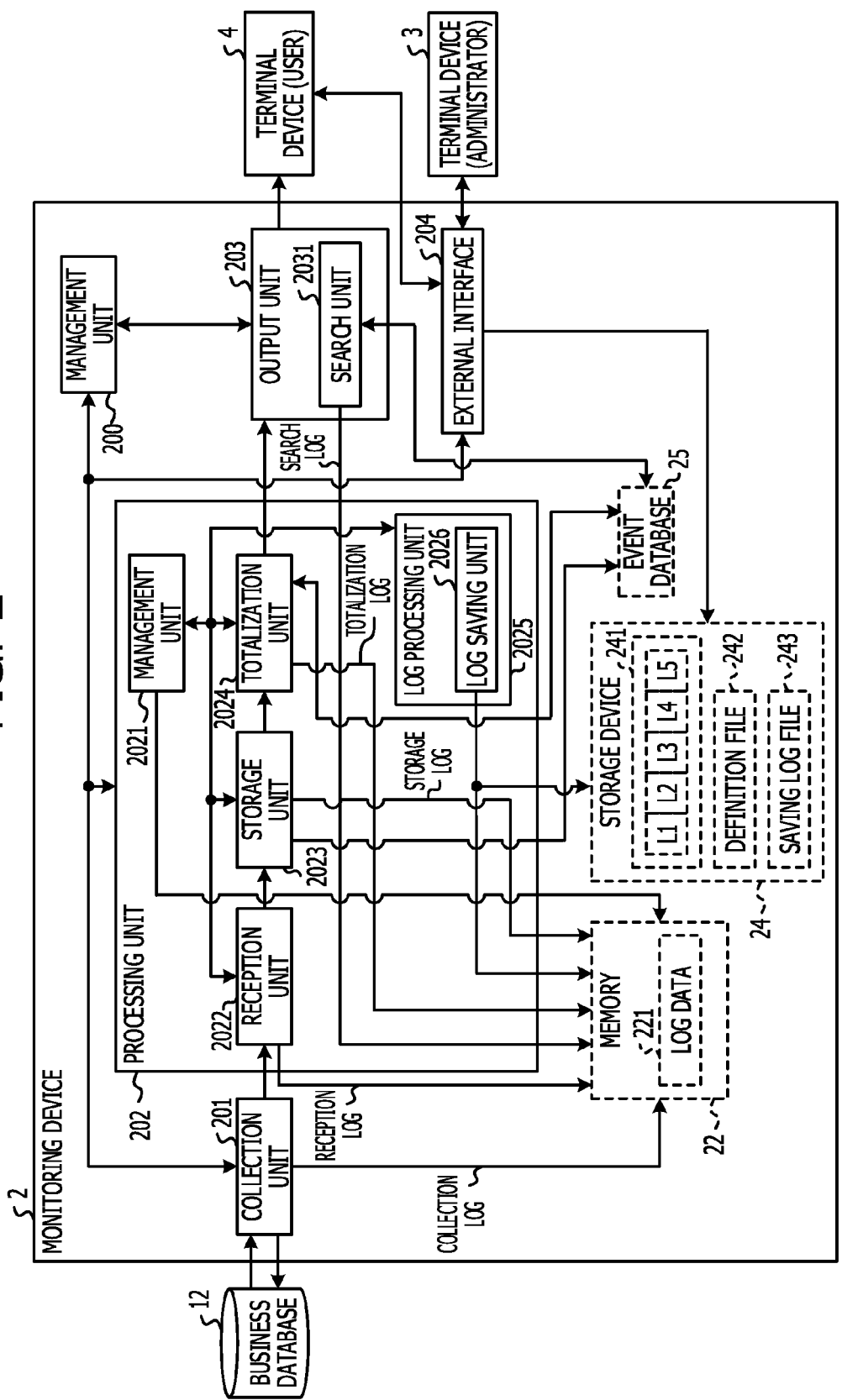
FIG. 2 is a block diagram of a software module.

The event database 25 includes a storage device such as an HDD, and is a database that stores therein, in a predetermined format, an event collected from the business database 12 in the business system 1 by a collection unit to be described in FIG. 2 and manages the event.

The recording medium reading device 26 is a device reading data recorded in a recording medium 261. The recording medium 261 is, for example, a portable recording medium such as a compact disc read only memory (CD-ROM), a digital versatile disc (DVD), or a universal serial bus (USB) memory. In addition, a program to be described in FIG. 2 may also be recorded in this recording medium 261.

The terminal device 3 is the terminal device of the administrator managing the monitoring device 2, and creates a definition file 242 to be described in FIG. 9.

The terminal device 4 is a terminal device for the user of the monitoring device 2, connects to the monitoring device 2 through, for example, a web browser, and receives and display-outputs various kinds of information the monitoring device 2 outputs.

(Software Module)

FIG. 2 is the block diagram of a software module in the monitoring device 2 illustrated in FIG. 1. In the monitoring device 2, the memory 22, the storage device 24, and the event database 25, which serve as hardware elements, are illustrated using dotted lines. The monitoring device 2 includes a management unit 200, a collection unit 201, a processing unit 202, an output unit 203, and an external interface 204.

The management unit 200 manages a software module the monitoring device 2 executes. Specifically, the management unit 200 manages the collection unit 201, the processing unit 202, the output unit 203, and the external interface 204. The collection unit 201 executes collection processing for an event. Specifically, the collection unit 201 connects to the business database 12 in the business system 1 (refer to FIG. 1) at intervals of a predetermined time, and requests to transmit an uncollected event. The predetermined time is, for example, 10 seconds, 1 minute, 10 minutes, 1 hour, 12 hours, or 24 hours. In the following description, since the frequency of update of events in the business database 12 is less frequent, it is assumed that the predetermined time is 1 hour. In response to the above-mentioned request, the business database 12 collects an event the collection unit 201 has not yet collected, and transmits the collected event to the collection unit 201. The collection unit 201 receives and outputs the event transmitted from the business database 12, to the processing unit 202.

Furthermore, the collection unit 201 collects an event from the business system 1, and stores, in the memory 22, a collection log indicating the log of the processing for outputting the collected event to the processing unit 202, as the log data 221. A time and date when processing for connecting to the business database 12 in the business system 1 has been executed and connection information indicating whether the connection processing has succeeded or failed are caused to be included in the collection log by the collection unit 201. Furthermore, when the above-mentioned connection processing has succeeded, a time and date when processing for collecting business data from the business database 12 has been executed and collection information indicating whether the collection processing has succeeded or failed are caused to be included in the collection log by the collection unit 201.

The processing unit 202 executes various kinds of processing on events collected by the collection unit 201. The processing unit 202 includes a management unit 2021, a reception unit 2022, a storage unit 2023, a totalization unit 2024, a log processing unit 2025, and a log saving unit 2026.

The management unit 2021 is also called an operations manager, and manages the whole processing unit 202. Specifically, the management unit 2021 performs operation management for the reception unit 2022, the storage unit 2023, the totalization unit 2024, the log processing unit 2025, and the log saving unit 2026.

The reception unit 2022 functions as an interface for the collection unit 201, receives an event input from the collection unit 201, and outputs the event to the storage unit 2023. The reception unit 2022 stores, in the memory 22, a reception log indicating the log of the processing for receiving the event, as the log data 221. Reception information indicating whether the reception of the event has succeeded or failed and the time and date of the success or failure are caused to be included in the reception log by the reception unit 2022.

The storage unit 2023 stores, in a storage device, the event input from the reception unit 2022, and creates the event database 25. In other words, the storage unit 2023 stores, in the event database 25, the event input from the reception unit 2022. The storage unit 2023 stores, in the memory 22, a storage log indicating the log of the processing for storing the event in the event database 25, as the log data 221. A time and date when processing for connecting to the event database 25 has been executed and connection information indicating whether the connection processing has succeeded or failed are caused to be included in the storage log by the storage unit 2023. Furthermore, when the above-mentioned connection processing has succeeded, a time and date when the storage processing for storing the event in the event database 25 has been executed and storage information indicating whether the storage processing has succeeded or failed are caused to be included in the storage log by the storage unit 2023.

The totalization unit 2024 connects to the event database 25 with timing, for example, when the processing where the storage unit 2023 stores the event in the event database 25 has been terminated. In addition, the totalization unit 2024 acquires an event the event database 25 stores, executes, on the various kinds of numerical values of the acquired event, various kinds of computation processing desired for executing BPM, and outputs the various kinds of numerical values to the output unit 203, as computed data. In addition, the processing unit 202 stores the computed data in the event database 25. Examples of the above-mentioned various kinds of computation processing include totalization processing for calculating the average or sum total of the above-mentioned numerical values. In addition to this, at intervals of a predetermined time (for example, 10 minutes intervals) or in response to a totalization start instruction input from the terminal device 4 through the external interface 204 and the management unit 200, the totalization unit 2024 may also execute processing for connecting to the event database 25, processing for acquiring an event, and the totalization processing.

The totalization unit 2024 stores, in the memory 22, a totalization log indicating the log of processing for totalizing events, as the log data 221. A time and date when processing for connecting to the event database 25 has been executed and connection information indicating whether the connection processing has succeeded or failed are caused to be included in the totalization log by the totalization unit 2024. When the above-mentioned connection processing has succeeded, a time and date when acquisition processing for an event has been executed and acquisition information indicating whether the acquisition processing has succeeded or failed are caused to be included in the totalization log by the totalization unit 2024. Furthermore, when the above-mentioned acquisition processing has succeeded, a time and date when the totalization processing has been executed and totalization information indicating whether the totalization processing has succeeded or failed are caused to be included in the totalization log by the totalization unit 2024.

On the basis of an event the event database 25 stores therein or data the processing unit 202 has output, as described in FIG. 1, the output unit 203 display-outputs, to the terminal device 4 for the user, a content in which a latest business status is visualized, or display-outputs an alert to the terminal device 4. These display output functions are also called dashboard functions. In addition, the output unit 203 may also notify the user of the visualized content or the above-mentioned alert, using an electronic mail. In addition to this, when there are a script used for outputting the above-mentioned visualized content and a script used for outputting the alert, the output unit 203 may also activate these scripts. These scripts are, for example, batch files. In addition, the output unit 203 may also output the various kinds of numerical values of business data using a file having a comma separated values (CSV) format.

In the following description, a case will be exemplified and described where the output unit 203 displays a content in which a latest business status is visualized. When displaying a content in which a latest business status is visualized, the output unit 203 acquires a plurality of events the event database 25 stores therein, graphically illustrates a change in the temporal sequence of a plurality of numerical values the plural events individually have, and display-outputs the change. When the above-mentioned event includes the quantity of stock of a commercial product in one shop, the above-mentioned numerical value is the amount of stock of the commercial product.

A search unit 2031 in the output unit 203 is an application program interface (API) used for searching for an event, and searches for an event matching a search condition, within a plurality of events the event database 25 stores therein. The output unit 203 gives, to the search unit 2031, a search instruction including a search condition specified by, for example, the user. In response to the search instruction, the search unit 2031 connects to the event database 25, and searches for an event matching the specified search condition within the plural events the event database 25 stores therein. On the basis of the event the search unit 2031 has searched for, the output unit 203 graphically illustrates and display-outputs the above-mentioned change in the temporal sequence of the numerical values.

In accordance with the execution of each of a plurality of processing operations, the log processing unit 2025 allocates, to each of the plural processing operations, a storage area in the storage device 24, which stores therein the log of each processing operation of the plural processing operations. Each storage area allocated to each of these plural processing operations corresponds to a log file storing therein the log of each processing operation in the plural processing operations.

The log processing unit 2025 allocates, to the above-mentioned collection processing, a storage area (refer to a symbol L1 in FIG. 2) storing therein a collection log output by the collection unit 201 executing the collection processing. The log processing unit 2025 allocates, to the above-mentioned reception processing, a storage area (refer to a symbol L2 in FIG. 2) storing therein a reception log output by the reception unit 2022 executing the reception processing. The log processing unit 2025 allocates, to the above-mentioned storage processing, a storage area (refer to a symbol L3 in FIG. 2) storing therein a storage log output by the storage unit 2023 executing the storage processing.

Furthermore, the log processing unit 2025 allocates, to the above-mentioned totalization processing, a storage area (refer to a symbol L4 in FIG. 2) storing therein a totalization log output by the totalization unit 2024 executing the totalization processing. The log processing unit 2025 allocates, to the above-mentioned search processing, a storage area (refer to a symbol L5 in FIG. 2) storing therein a search log output by the search unit 2031 executing the search processing.

The storage device 24 is an example of a storage mechanism including a plurality of storage areas that are individually allocated to a plurality of processing operations and store therein history information (also called a log) indicating the histories of individual processing operations of the plural processing operations in accordance with the execution of the individual plural processing operations. The plural storage areas are, for example, areas in the storage device 24, schematically illustrated by the symbols L1 to L5.

The log processing unit 2025 individually records, in different log files, a collection log the collection unit 201 has output, a reception log the reception unit 2022 has output, a storage log the storage unit 2023 has output, a totalization log the totalization unit 2024 has output, and a search log the search unit 2031 has output. The output collection log, reception log, storage log, totalization log, and search log are logs (also called on-memory logs) the memory 22 stores therein. In other words, the memory 22 only buffers a log on a memory.

With timing when the collection log, the reception log, the storage log, the totalization log, and the search log have been stored in the memory 22, the log processing unit 2025 individually stores these logs in the storage device 24, as different log files. The log file of the collection log is also indicated by the symbol "L1.", the log file of the reception log is also indicated by the symbol "L2", and the log file of the storage log is also indicated by the symbol "L3". The log file of the totalization log is also indicated by the symbol "L4", and the log file of the search log is also indicated by the symbol "L5".

Furthermore, when the information amount of logs stored in the above-mentioned storage area has exceeded a predetermined amount, the log processing unit 2025 deletes the oldest stored log from the logs stored in the storage area storing therein the logs having exceeded the predetermined amount. Specifically, when the size of one log file of these log files (L1 to L5) has exceeded a predetermined size, the log processing unit 2025 performs log storage of a cyclic method where the oldest stored log is deleted from logs stored in the log file having exceeded the predetermined size. The predetermined size is, for example, 500 Kbyte or 1 Mbyte. By reducing the size of the log file to the predetermined size or less using such a cyclic method, an increase in the file size of the log file is suppressed.

When a failure (hereinafter, arbitrarily described as an error) has occurred while the collection unit 201, the reception unit 2022, the storage unit 2023, the totalization unit 2024, or the search unit 2031 is executing a processing operation, the log saving unit 2026 detects the occurrence of the error and executes the following processing. In other words, on the basis of a definition file D1 in FIG. 9, the log saving unit 2026 extracts a log from among logs in the above-mentioned plural log files, and saves, in the storage device 24, the log as the saving log file 243. Here, saving is also called duplicating.

The external interface 204 provides an interface for the terminal device 3 for the administrator and the terminal device 4 for the user. Specifically, the external interface 204 receives an operation instruction from the terminal device 3 or the terminal device 4, and transfers the operation instruction to the management unit 200. The management unit 200 executes processing corresponding to the input operation instruction. For example, when having received a storage instruction including a definition file transmitted by the terminal device 3, the external interface 204 transfers the storage instruction to the management unit 200. When having received the input storage instruction, the management unit 200 stores the definition file included in the storage instruction, in the storage device 24 (refer to the symbol 242) through the external interface 204. In this way, the external interface 204 receives, from the terminal device 3, the definition file 242 created by the administrator of the monitoring device 2 using the terminal device 3 being used for the administrator and serving as an example of an external device, and stores the definition file 242 in the storage device 24.

The collection unit 201, the processing unit 202, the output unit 203, and the external interface 204 are so-called programs (also called as software). Likewise, the management unit 2021, the reception unit 2022, the storage unit 2023, the totalization unit 2024, the log processing unit 2025, the log saving unit 2026, and the search unit 2031 are so-called programs. These programs are stored in, for example, the storage device 24. At the time of start-up, the CPU 21 in FIG. 1 reads these programs from the storage device 24, and causes these programs to operate as software modules, by deploying these programs in the memory 22.

The monitoring device 2, described above, is also called an information processing apparatus, and repeatedly executes processing where a plurality of processing operations are sequentially executed and individual logs indicating the history information of the individual executed processing operations are stored in the log files of the individual processing operations. Here, the history of processing is, for example, a time and date when this processing has been executed or the content of this processing.

As the above-mentioned plural processing operations, the monitoring device 2 has a first processing sequence including a plurality of processing operations to be continuously executed and a second processing sequence performing processing using the processing result of the first processing sequence, and repeatedly executes the first processing sequence.

As the first processing sequence, the monitoring device 2 has, for example, the following processing. In other words, the monitoring device 2 has processing (refer to the collection unit 201) for collecting the unit data of business data processed by the business system executing business processing, processing (refer to the reception unit 2022) for receiving the collected unit data, and processing (refer to the storage unit 2023) for storing the unit data in a storage device (also called a storage mechanism) and creating a database. In addition, as the second processing sequence, the monitoring device 2 has, for example, processing (refer to the search unit 2031) for searching for the unit data within the event database 25. The unit data is the event described in FIG. 2.

In other words, as the above-mentioned plural processing operations, the monitoring device 2 has processing for collecting an event, processing for storing the event in a storage device and creating a database, and processing (refer to the output unit 203) for monitoring the unit data of the database.

Figure 3:
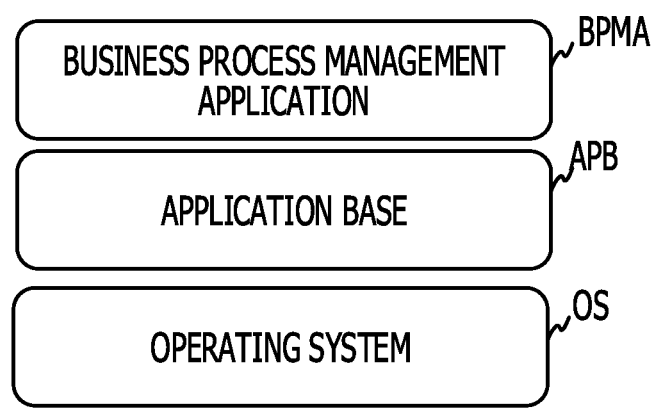
FIG. 3 is a diagram schematically illustrating a hierarchical relationship between software and other software a monitoring device executes.

FIG. 3 is a diagram schematically illustrating a hierarchical relationship between the software described in FIG. 2 and other software the monitoring device 2 executes. A symbol OS indicates a so-called operating system managing an overall computer system.

A symbol APB is a so-called application base serving as an execution base causing the software module (also called an application) described in FIG. 2 to operate. The application base APB operates on the operating system OS.

A symbol BPMA indicates the business process management application BPMA including the collection unit 201, the processing unit 202, the output unit 203, and the external interface 204, described in FIG. 2. The business process management application BPMA operates on the application base APB.

The operating system OS and the business process management application BPMA are so-called programs. The programs are stored in, for example, the storage device 24. At the time of start-up, the CPU 21 in FIG. 1 reads these programs from the storage device 24, and causes these programs to operate as an operating system and an application base, by deploying these programs in the memory 22.

(Creation Processing for Log File)

With reference to FIG. 1, FIG. 2, and FIG. 4 to FIG. 8, a creation processing for a log file will be described. FIG. 4 to FIG. 8 illustrate examples of the log file described in FIG. 2, which are examples of the stores log file group 241 the storage device 24 in FIG. 1 stores therein. Each of the log files in FIG. 4 to FIG. 8 includes a time and date field, an ID field, and a content field. In addition, the ID means an identifier. In FIG. 4 to FIG. 8, " . . . " means the omission of description, and a blank filed means being unlisted.

FIG. 4 is a diagram illustrating an example of a collection log file. A collection log file L1 corresponds to the symbol "L1" in FIG. 2. The content of the collection log file L1 will be described later. FIG. 5 is a diagram illustrating an example of a reception log file. A reception log file L2 corresponds to the symbol "L2" in FIG. 2. The content of the reception log file L2 will be described later. FIG. 6 is a diagram illustrating an example of a storage log file. A storage log file L3 corresponds to the symbol "L3" in FIG. 2. The content of the storage log file L3 will be described later.

FIG. 7 is a diagram illustrating an example of a totalization log file. A totalization log file L4 corresponds to the symbol "L4" in FIG. 2. The content of the totalization log file L4 will be described later. FIG. 8 is a diagram illustrating an example of a search log file. A search log file L5 corresponds to the symbol "L5" in FIG. 2. The content of the search log file L5 will be described later.

The collection unit 201 in FIG. 2 connects to the business database 12 in the business system 1 (refer to FIG. 1), and collects an uncollected event from the business database 12. The collection unit 201 generates a collection log including a connection time and date when processing for connecting to the business database 12 has been executed and connection information indicating the success of the connection processing, and stores, in the memory 22, the collection log as the log data 221. The collection unit 201 generates a connection ID uniquely identifying the above-mentioned connection information, and stores the connection ID in the memory 22 along with the collection log. As the connection time and date, there is, for example, "2012-02-19 12:28", and as the connection information, there is "connection to the business database has succeeded". As the connection ID, there is "CL010".

The collection unit 201 generates a collection log including a collection time and date when an event has been collected and collection information indicating the success of the collection processing, and stores, in the memory 22, the collection log as the log data 221. The collection unit 201 generates a collection ID uniquely identifying the above-mentioned collection information, and stores the collection ID in the memory 22 along with the collection log. As the collection time and date, there is, for example, "2012-02-19 12:28", and as the collection information, there is "the collection of an event from the business database has succeeded". As the collection ID, there is "CL011".

In the storage device 24, the log processing unit 2025 stores a collection log existing in the memory 22, as the log file group 241. The log processing unit 2025 stores the log file group 241, in the directory of the storage device 24, indicated by, for example, "${BPMA_HOME}/log/" described in FIG. 9.

Specifically, as illustrated in the collection log file L1 in FIG. 4, the log processing unit 2025 stores, in the storage device 24 in a table form, the connection time and date, the connection ID, the connection information, the collection time and date, the collection ID, and the collection information, which are described above.

In the above-mentioned example, the log processing unit 2025 stores, in the time and date field of the collection log file L1 in FIG. 4, "2012-02-19 12:28" as the connection time and date and the collection time and date, and stores, in the ID field of the collection log file L1, "CL010" as the connection ID and "CL011" as the collection ID. The log processing unit 2025 stores, in the content field of the collection log file L1, "connection to the business database has succeeded" as the connection information and "the collection of an event from the business database has succeeded" as the collection information.

In addition, the collection unit 201 in FIG. 2 outputs the collected event to the reception unit 2022. The reception unit 2022 receives the event input from the collection unit 201, and outputs the event to the storage unit 2023. The reception unit 2022 generates a reception log including a reception time and date when the reception processing for an event has been executed and reception information indicating the success of the reception processing, and stores, in the memory 22, the reception log as the log data 221. The reception unit 2022 generates a reception ID uniquely identifying the above-mentioned reception information, and stores the reception ID in the memory 22 along with the reception log.

As the reception time and date, there is, for example, "2012-02-19 12:28", and as the reception information, there is "the reception of an event has succeeded". As the reception ID, there is "NT010".

The log processing unit 2025 stores, in the storage device 24, a reception log existing in the memory 22, as the log file group 241. Specifically, as illustrated in the reception log file L2 in FIG. 5, the log processing unit 2025 stores, in the storage device 24 in a table form, the reception time and date, the reception ID, and the reception information, which are described above.

In the above-mentioned example, the log processing unit 2025 stores, in the time and date field of the reception log file L2, "2012-02-19 12:28" as the reception time and date, and stores "NT010" in the ID field of the reception log file L2. The log processing unit 2025 stores, in the content field of the reception log file L2, "the reception of an event has succeeded" as the reception information.

The storage unit 2023 connects to the event database 25, and stores, in the event database 25, an event input from the reception unit 2022. The storage unit 2023 generates a storage log including a connection time and date when processing for connecting to the event database 25 has been executed and connection information indicating the success of the connection processing, and stores, in the memory 22, the storage log as the log data 221. The storage unit 2023 generates a connection ID uniquely identifying the above-mentioned connection information, and stores the connection ID in the memory 22 along with the storage log. As the connection time and date, there is, for example, "2012-02-19 12:28", and as the connection information, there is "connection to the event database has succeeded". As the connection ID, there is "RG010".

The storage unit 2023 generates a storage log including a storage time and date when an event has been stored and storage information indicating the success of the storage processing, and stores, in the memory 22, the storage log as the log data 221. The storage unit 2023 generates a storage ID uniquely identifying the above-mentioned storage information, and stores the storage ID in the memory 22 along with the storage log. As the storage time and date, there is, for example, "2012-02-19 12:28", and as the storage information, there is "event storage for the event database has succeeded". As the storage ID, there is "RG011".

The log processing unit 2025 stores, in the storage device 24, a storage log existing in the memory 22, as the log file group 241. Specifically, as illustrated in the storage log file L3 in FIG. 6, the log processing unit 2025 stores, in the storage device 24 in a table form, the connection time and date, the connection ID, the connection information, the storage time and date, the storage ID, and the storage information, which are described above.

In the above-mentioned example, the log processing unit 2025 stores, in the time and date field of the storage log file L3, "2012-02-19 12:28" as the connection time and date and the storage time and date, and stores, in the ID field of the storage log file L3, "RG010" as the connection ID and "RG011" as the storage ID. The log processing unit 2025 stores, in the content field of the storage log file L3, "connection to the event database has succeeded" as the connection information and "event storage for the event database has succeeded" as the storage information.

The totalization unit 2024 connects to the event database 25, acquires an event the event database 25 stores therein, and executes totalization processing on the acquired event. The totalization unit 2024 generates a totalization log including a connection time and date when processing for connecting to the event database 25 has been executed and connection information indicating the success of the connection processing, and stores, in the memory 22, the totalization log as the log data 221.

The totalization unit 2024 generates a connection ID uniquely identifying the above-mentioned connection information, and stores the connection ID in the memory 22 along with the totalization log. As the connection time and date, there is, for example, "2012-02-19 12:28", and as the connection information, there is "connection to the event database has succeeded". As the connection ID, there is "ST010".

The totalization unit 2024 generates a totalization log including an acquisition time and date when acquisition processing for an event has been executed and acquisition information indicating the success of the acquisition processing, and stores, in the memory 22, the totalization log as the log data 221. The totalization unit 2024 generates an acquisition ID uniquely identifying the above-mentioned acquisition information, and stores the acquisition ID in the memory 22 along with the totalization log. As the acquisition time and date, there is, for example, "2012-02-19 12:28", and as the acquisition information, there is "the acquisition of an event from the event database has succeeded". As the acquisition ID, there is "ST011".

The totalization unit 2024 generates a totalization log including a totalization time and date when totalization processing has been executed and totalization information indicating the success of the totalization processing, and stores, in the memory 22, the totalization log as the log data 221. The totalization unit 2024 generates a totalization ID uniquely identifying the above-mentioned totalization information, and stores the totalization ID in the memory 22 along with the totalization log. As the totalization time and date, there is, for example, "2012-02-19 12:28", and as the totalization information, there is "the totalization processing has succeeded". As the totalization ID, there is "ST012".

The log processing unit 2025 stores, in the storage device 24, a totalization log existing in the memory 22, as the log file group 241. Specifically, as illustrated in the totalization log file L4 in FIG. 7, the log processing unit 2025 stores, in the storage device 24 in a table form, the connection time and date, the connection ID, the connection information, the acquisition time and date, the acquisition ID, the acquisition information, the totalization time and date, the totalization ID, and the totalization information, which are described above.

In the above-mentioned example, the log processing unit 2025 stores, in the time and date field of the totalization log file L4, "2012-02-19 12:28" as the connection time and date, the acquisition time and date, and the totalization time and date, and stores, in the ID field of the totalization log file L4, "ST010" as the connection ID, "ST011" as the acquisition ID, and "ST012" as the totalization ID. The log processing unit 2025 stores, in the content field of the totalization log file L4, "connection to the event database has succeeded" as the connection information and "the acquisition of an event from the event database has succeeded" as the acquisition information. Furthermore, the log processing unit 2025 stores, in the content field of the totalization log file L4, "the totalization processing has succeeded" as the totalization information.

The search unit 2031 connects to the event database 25, and searches for, for example, an event matching time and date information specified as a search condition, within a plurality of events the event database 25 stores therein.

The search unit 2031 generates a search log including a connection time and date when processing for connecting to the event database 25 has been executed and connection information indicating the success of the connection processing, and stores, in the memory 22, the search log as the log data 221.

The search unit 2031 generates a connection ID uniquely identifying the above-mentioned connection information, and stores the connection ID in the memory 22 along with the search log. As the connection time and date, there is, for example, "2012-02-19 12:30", and as the connection information, there is "connection to the event database has succeeded". As the connection ID, there is "AM010".

The search unit 2031 generates a search log including a search time and date when search processing has been executed and search information indicating the success of the search processing, and stores, in the memory 22, the search log as the log data 221. The search unit 2031 generates a search ID uniquely identifying the above-mentioned search information, and stores the search ID in the memory 22 along with the search log. As the search time and date, there is, for example, "2012-02-19 12:32", and as the search information, there is "search for an event within the event database has succeeded". As the search ID, there is "AM011".

The log processing unit 2025 stores, in the storage device 24, a search log existing in the memory 22, as the log file group 241.

Specifically, as illustrated in the search log file L5 in FIG. 8, the log processing unit 2025 stores, in the storage device 24 in a table form, the connection time and date, the connection ID, the connection information, the search time and date, the search ID, and the search information, which are described above. In the above-mentioned example, the log processing unit 2025 stores, in the time and date field of the search log file L5, "2012-02-19 12:30" as the connection time and date and "2012-02-19 12:32" as the search time and date, and stores, in the ID field of the search log file L5, "AM010" as the connection ID and "AM011" as the search ID. The log processing unit 2025 stores, in the content field of the search log file L5, "connection to the event database has succeeded" as the connection information and "search for an event within the event database has succeeded" as the search information.

As described in FIG. 4 to FIG. 8, the reason why the log processing unit 2025 stores each log of each processing operation in each log file of each processing operation is that the content of each processing operation is different. In addition, the reason is that, by storing each log in each log file, log management is facilitated. Furthermore, the reason is that the effectiveness of a log analytical work due to the administrator is improved.

Incidentally, a case will be assumed where an error occurs when the monitoring device 2 executes a processing operation in a subsequent stage in the case of the sequential execution of various types of processing operations, as described in FIG. 2. In the case of such an assumption, in some cases, an error occurs at the time of the execution of the processing operation in the subsequent stage, on the ground of an error that occurred at the time of the execution of a processing operation executed before the execution of the processing operation in the subsequent stage. For example, when processing for connecting to the business database 12 has failed, it is difficult for the collection unit 201 in FIG. 2 to collect an event. As a result, the event database 25 does not store the event. At this time, since an event serving as the target of search due to the search unit 2031 is not stored in the event database 25, in some cases an error (search failure) occurs in search processing the search unit 2031 executes.

In such a case, so as to analyze the cause of an error having occurred at the time of the execution of the processing operation in the subsequent stage, the administrator is desired to analyze the log file of the subsequent stage, which stores therein a log in the processing operation in the subsequent stage, and the log file of a preceding stage, which stores therein a log in a processing operation in the preceding stage, the processing operation in the preceding stage having been executed before the execution of the processing operation in the subsequent stage.

In particular, when there are a plurality of processing operations during a time period leading from the processing operation in the preceding stage to the processing operation in the subsequent stage, the administrator is desired to analyze at least all the following log files in order to analyze the cause of an error having occurred at the time of the execution of the processing operation in the subsequent stage. Therefore, an analytical work for an error cause becomes complicated. In other words, log files serving as analysis targets are a log file corresponding to the processing operation in the preceding stage, a log file corresponding to the processing operation in the subsequent stage, and a plurality of log files corresponding to the plural processing operations executed during the time period leading from the processing operation in the preceding stage to the processing operation in the subsequent stage. In the above-mentioned example, the administrator is desired to trace back individual processing operations leading to the search processing and analyze the search log file L5 in FIG. 8, the totalization log file L4 in FIG. 7, the storage log file L3 in FIG. 6, the reception log file L2 in FIG. 5, and the collection log file L1 in FIG. 4. In order to analyze the error cause, the administrator is desired to analyze a large number of log files, and the analytical work for an error cause becomes complicated.

In addition, the log processing unit 2025 in FIG. 2 performs log storage of a cyclic method. Accordingly, when a time from when an error occurs till when the administrator analyzes the cause of the error is long, in some cases the log processing unit 2025 deletes, from a log file, a log desired for the analysis of an error cause.

Therefore, the monitoring device 2 preliminarily stores information used for identifying a log contributing to a cause analysis for an error, as the association information described in FIG. 9, and when an error has occurred, the monitoring device 2 duplicates (saves) a log desired for the analysis of an error cause, in a storage area different from storage areas (refer to the symbols L1 to L5 in FIG. 2) storing therein logs, on the basis of this association information. The log processing unit 2025 in the monitoring device 2 does not delete a saved log in the absence of an instruction.

(Definition File)

FIG. 9 is a diagram illustrating an example of the definition file 242 in FIG. 2. A definition file D1 in FIG. 9 is an example of association information where the content of an error occurring in one processing operation of a plurality of processing operations and at least one storage area of the plural storage areas (refer to the symbol L1 to the symbol L5 in FIG. 2) are associated with each other, which are described in FIG. 2. The plural processing operations are, for example, processing operations the collection unit 201, the reception unit 2022, the storage unit 2023, the totalization unit 2024, and the output unit 203 (the search unit 2031) execute.

The definition file D1 includes, for example, a log saving condition serving as a condition used for saving a log, as the content of an error occurring in one processing operation of a plurality of processing operations.

The definition file D1 includes, for example, log file identification information used for identifying a log file to be a saving target and log identification information used for identifying a log to be a saving target. The log file identification information is an example of storage area identification information used for identifying a storage area storing therein a log serving as a duplication target. The log identification information is an example of history information identification information used for identifying the history information of the duplication target.

The administrator of the monitoring device 2 creates the definition file 242 using the terminal device 3, and stores the definition file 242 in the monitoring device 2. In the definition file D1, the log saving condition is a character string "{[SEARCH_ERROR]=>1},". The "[SEARCH_ERROR]=>1" indicates that a log identified by the log file identification information and the log identification information is saved as the saving log file 243 when one or more search errors have occurred.

The log file identification information corresponds to the first to fifth file character strings illustrated below. The first file character string is "{BPMA_HOME}/log/bpmeventcollection.log;". The second file character string is "${BPMA_HOME}/log/notification.log;". The third file character string is "{BPMA_HOME}/log/bpmeventregistration.log;". The fourth file character string is "${BPMA_HOME}/log/statistics.log;". The fifth file character string is "{BPMA_HOME}/log/activitymonitorlog".

In the file character string, "arbitrary alphabetical characters.log" indicates the name of a log file including a log to be a saving target. For example, in the first file character string, "bpmeventcollection.log" indicates a log file name. In addition, here, for ease of explanation, a character string ("log" in the above-mentioned example) following "." called an extension is also defined as a log file name.

A log file indicated by the file name, "bpmeventcollection.log", is, for example, the collection log file L1 in FIG. 4. A log file indicated by the file name, "notification.log", is, for example, the reception log file L2 in FIG. 5. A log file indicated by the file name, "bpmeventregistration.log", is, for example, the storage log file L3 in FIG. 6. A log file indicated by the file name, "statistics.log", is, for example, the totalization log file L4 in FIG. 7. A log file indicated by the file name, "activitymonitor.log", is, for example, the search log file L5 in FIG. 8.

In the above-mentioned file character string, "${BPMA_HOME}/log/" indicates the file path of a log file in the storage device 24 when the storage device 24 stores therein the above-mentioned log file in a directory structure. In addition, "${BPMA_HOME}" is a so-called environment variable, and indicates a directory in which the above-mentioned file is stored. In addition, "flog" indicates a log recording directory provided in the low-level hierarchy of a directory indicated by the above-mentioned environment variable.

The log identification information is a character string, "[DATETIME]+−300" ("+−" means "±"). This character string indicates that when an error matching a condition specified by a log saving condition has occurred, a log is identified from among logs in a log file identified by log file identification information, the log indicating the history of processing executed during a time range ranging from 300 seconds before through 300 seconds after the occurrence time and date of this error as a base.

As described above, in the definition file D1, the content of an error occurring in a processing operation (search processing operation) of the above-mentioned second processing sequence and a storage area (refer to the symbol L5 in FIG. 2) storing therein the logs of the processing operations of the first and second processing sequences are associated with each other.

On the basis of the logs of a plurality of processing operations in execution, the log processing unit 2025 in FIG. 2 detects an error having occurred in a processing operation in execution. In the example in FIG. 2, the above-mentioned plural logs are the collection log, the reception log, the storage log, the totalization log, and the search log.

When an error has occurred in one processing operation of the plural processing operations and the log processing unit 2025 has detected this error, the log saving unit 2026 executes the following processing. The log saving unit 2026 duplicates, in a storage area different from the plural storage areas (refer to the symbols L1 to L5 in FIG. 2), a log stored in a storage area associated with the content of an error coinciding with the above-mentioned error having occurred, in the association information (refer to in the definition file FIG. 9) stored in the storage device 24 in FIG. 2. The above-mentioned different storage area is illustrated by the symbol 243 in the storage device 24 in FIG. 2.

The log saving unit 2026 determines whether or not the content of the above-mentioned error having occurred matches a condition used for saving the above-mentioned log. For example, in the example of FIG. 9, the condition used for saving a log is a condition that one or more search errors have occurred. In this case, when one or more search errors have occurred, the log saving unit 2026 determines that the content of the above-mentioned error having occurred matches a condition used for saving the above-mentioned log.

When the content of the above-mentioned error having occurred matches the above-mentioned condition, the log saving unit 2026 duplicates a log stored in a storage area associated with the above-mentioned condition, in a storage area different from the above-mentioned plural storage areas.

Specifically, when the content of the above-mentioned error matches the above-mentioned condition, the log saving unit 2026 identifies a storage area storing therein a log serving as a duplication target, from among the above-mentioned plural storage areas, on the basis of the above-mentioned storage area identification information. For example, in the example of FIG. 9, the storage area identification information corresponds to the first to fifth file character strings, and in this case, the log saving unit 2026 identifies the storage areas indicated by the symbols L1 to L5 in FIG. 2. In other words, the log saving unit 2026 identifies the collection log file L1, the reception log file L2, the storage log file L3, the totalization log file L4, and the search log file L5.

In addition, on the basis of the above-mentioned history information identification information, the log saving unit 2026 identifies a log serving as a duplication target, from among logs in the above-mentioned identified storage areas. For example, the example of FIG. 9 indicates that the history information identification information identifies a log from among logs in the storage areas identified by the storage area identification information, the log indicating the history of processing executed during a time range ranging from 300 seconds before through 300 seconds after the occurrence time and date of this error as a base. The log saving unit 2026 identifies a log from among logs in the identified storage areas (the storage areas indicated by the symbols L1 to L5 in FIG. 2), the log indicating the history of processing executed during a time range ranging from 300 seconds before through 300 seconds after the occurrence time and date of a search error as a base. Next, the log saving unit 2026 duplicates (saves) the above-mentioned identified log, in a storage area different from the above-mentioned plural storage areas. As described above, the above-mentioned different storage area is schematically illustrated by the symbol 243 in the storage device 24 in FIG. 2. It is assumed that the log stored in this area corresponds to the saving log file 243.

FIG. 10 illustrates an example of the saving log file 243 in FIG. 2. A saving log file SL1 in FIG. 10 includes a time and date field, an ID field, and a content field. In the saving log file SL1, " . . . " means the omission of description, and a blank filed means being unlisted. The content of the saving log file SL1 will be described later.

(Flow of Processing Monitoring Device Executes)

Hereinafter, the flow of processing the monitoring device 2 executes will be described on the basis of flow diagrams in FIG. 11 and FIG. 12. First, initializing processing the monitoring device 2 executes will be described with reference to FIG. 11. Next, processing the monitoring device 2 executes when an error has occurred will be described with reference to FIG. 12.

Figure 11:
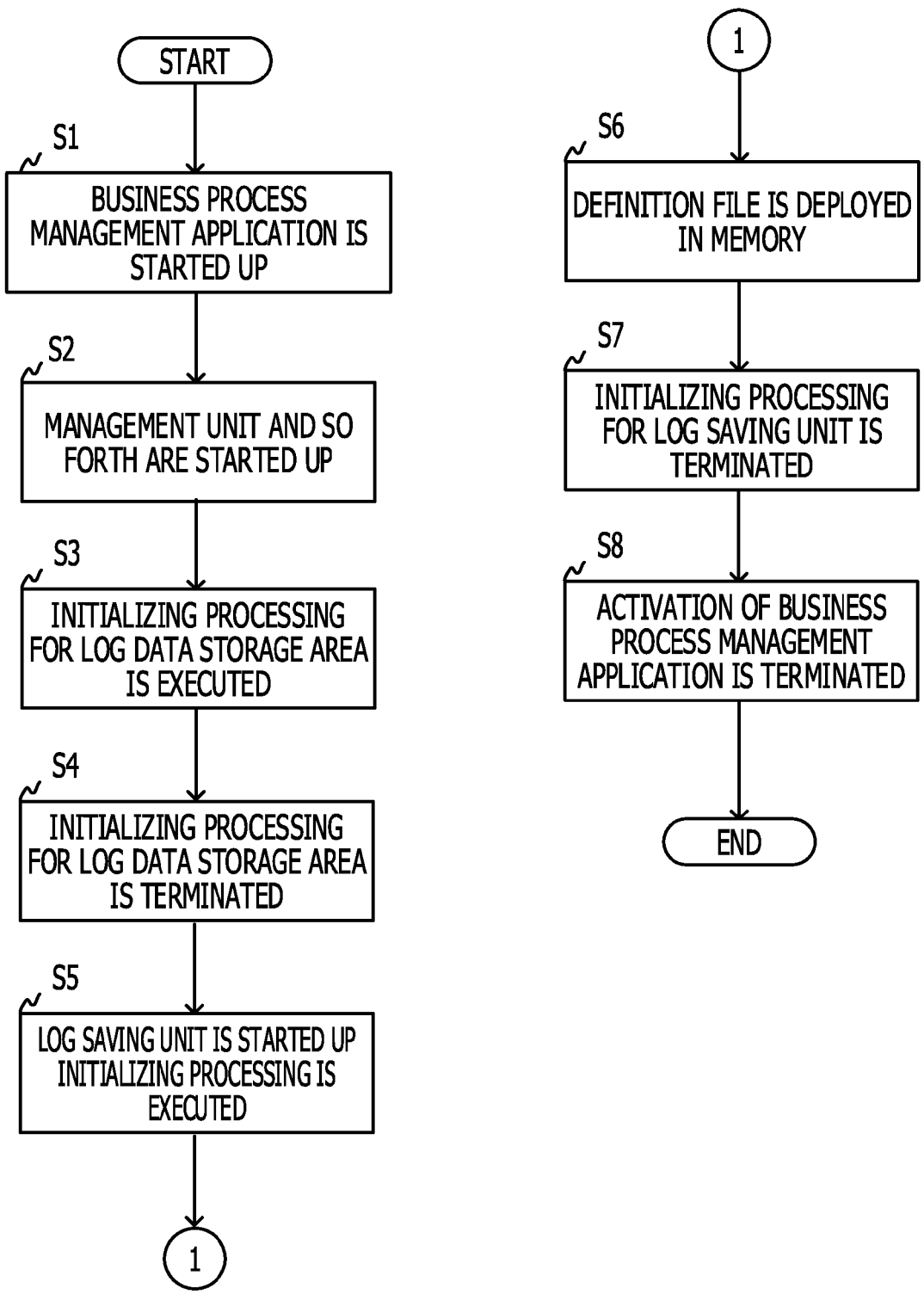
FIG. 11 is a flow diagram explaining a flow of initializing processing a monitoring device executes.

FIG. 11 is a flow diagram explaining the flow of the initializing processing the monitoring device 2 executes. The initializing processing the monitoring device 2 executes will be described with reference to FIG. 1 to FIG. 3 and FIG. 11. In addition, the definition file 242 described in FIG. 9 has already been stored in the storage device 24.

Step S1: the monitoring device 2 starts up the business process management application BPMA described in FIG. 3. Specifically, the CPU 21 in the monitoring device 2 reads the programs of the operating system OS and the application base APB, described in FIG. 3, from the storage device 24, and deploys these programs in the memory 22. Furthermore, the CPU 21 reads the program of the business process management application BPMA from the storage device 24, and deploys the program in the memory 22. Owing to the execution of the step S1, the monitoring device 2 puts the management unit 200, the collection unit 201, the processing unit 202, the output unit 203, and the external interface 204 into start-up states.

Step S2: The monitoring device 2 starts up the management unit 2021 and so forth in the processing unit 202, described in FIG. 2. Specifically, the management unit 200 the CPU 21 executes reads, from the storage device 24, the programs of the management unit 2021, the reception unit 2022, the storage unit 2023, the totalization unit 2024, the search unit 2031, and the log processing unit 2025, and deploys the programs in the memory 22.

Step S3: The management unit 2021 in the processing unit 202 decides an area in which log data is to be stored in the memory 22, and executes initializing processing for the decided area.

Step S4: The management unit 2021 in the processing unit 202 terminates the initializing processing in the step S3.

Step S5: The management unit 2021 in the processing unit 202 starts up the log saving unit 2026, and initializes the log saving unit 2026. Specifically, the management unit 2021 reads the program of the log saving unit 2026 from the storage device 24, and deploys the program in the memory 22.

Step S6: The log saving unit 2026 reads and deploys the definition file 242 from the storage device 24, in the memory 22.

Step S7: The management unit 2021 in the processing unit 202 terminates the initializing processing for the log saving unit 2026.

Step S8: The CPU 21 in the monitoring device 2 terminates the activation of the business process management application BPMA. Owing to the execution of the step S8, the collection unit 201, the processing unit 202, and the output unit 20 in the monitoring device 2 sequentially execute processing operations, and execute monitoring for the business system. In the execution of the processing operations, the storage processing for a log, described in FIG. 4 to FIG. 9, is executed.

Figure 12:
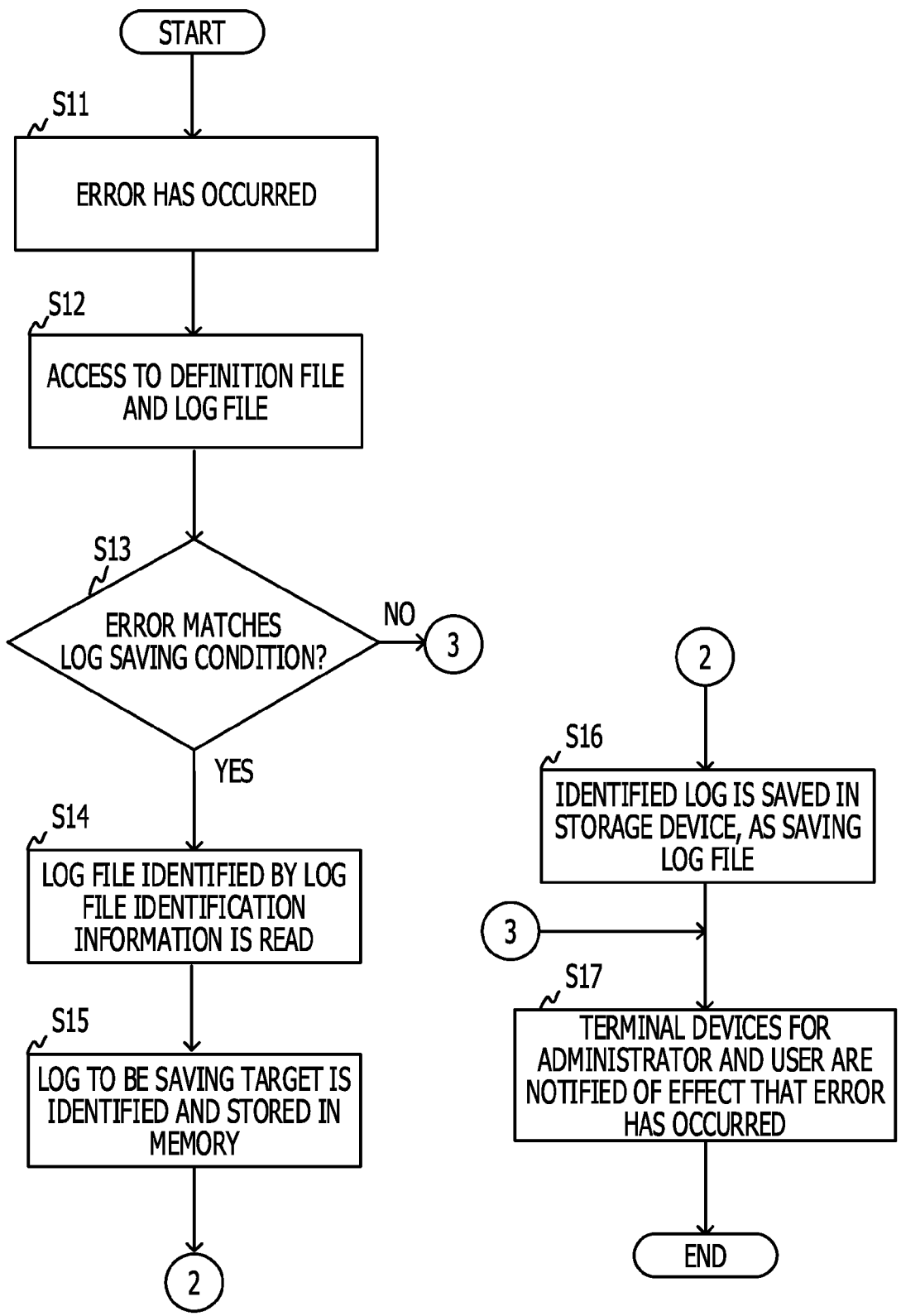
FIG. 12 is a flow diagram explaining a flow of processing a monitoring device executes when an error has occurred.

FIG. 12 is a flow diagram explaining the flow of processing the monitoring device 2 executes when an error has occurred. With reference to FIG. 2, FIG. 9, and FIG. 12, the flow of the processing the monitoring device 2 executes when an error has occurred will be described. In addition, the initializing processing described in FIG. 11 has already been terminated. In addition, the monitoring device 2 repeatedly executes, for example, the collection processing of the collection unit 201, the reception processing of the reception unit 2022, and the storage processing of the storage unit 2023, periodically collects an event from the business database 12, and stores the collected event in the event database 25. In addition, the log processing unit 2025 individually records, in different log files, a collection log the collection unit 201 has output, a reception log the reception unit 2022 has output, a storage log the storage unit 2023 has output, a totalization log the totalization unit 2024 has output, and a search log the search unit 2031 has output.

Step S11: Some kind of an error (also called an error event) occurs in the monitoring device 2. Specifically, it corresponds to a case where, in a plurality of processing operations executed by the collection unit 201, the reception unit 2022, the storage unit 2023, the totalization unit 2024, the output unit 203, and the search unit 2031, the above-mentioned processing operation has failed. In this way, a case where the above-mentioned processing operation has failed is the occurrence of an error. For example, there is a case where the collection unit 201 has failed in connecting to the business database 12 or a case where the search unit 2031 has failed in the search processing.

On the basis of the log of a processing operation in execution, the log processing unit 2025 detects an error having occurred in the processing operation in execution. Specifically, when new log data has been stored in the memory 22, the log processing unit 2025 accesses the above-mentioned log data, and acquires the content of this log data. In addition, the log processing unit 2025 determines whether "failure" indicating the occurrence of an error is included in the content of the log data, and when the "failure" indicating the occurrence of an error is included in the content of the log data, the log processing unit 2025 presumes that an error has occurred, and detects the error. When having detected the error, the log processing unit 2025 instructs the log saving unit 2026 to execute log saving processing.

Step S12: In response to the execution instruction from the log processing unit 2025, the log saving unit 2026 accesses a definition file and log data. Specifically, the log saving unit 2026 accesses the definition file 242 (refer to FIG. 9) deployed in memory 22 in the step S6 in FIG. 11, and furthermore, accesses a log corresponding to the error, in log data in the memory 22.

Step S13: The log saving unit 2026 determines whether the error matches the log saving condition the definition file D1 in FIG. 9 includes. In other words, when an error has occurred in one processing operation of a plurality of processing operations, the log saving unit 2026 in FIG. 2 determines whether the content of the error having occurred matches the content (for example, the log saving condition) of an error in the definition file D1. In the example of FIG. 9, it is determined whether the error is a search error. When the content of the error having occurred matches the content of an error in the definition file D1 in FIG. 9 (step S13/YES), the processing transfers to a step S14.

Step S14: The log saving unit 2026 reads, from the log file group 241 in the storage device 24, a log file identified by the log file identification information the definition file D1 in FIG. 9 includes. In other words, on the basis of the log file identification information in the definition file D1, the log saving unit 2026 identifies a log file storing therein a log serving as a saving target, from among logs in the log files (L1 to L4) of the individual processing operations, and reads the identified log file.

Step S15: On the basis of the log identification information, the log saving unit 2026 identifies a log to be a saving target, from among logs in the log file identified by the log file identification information the definition file D1 in FIG. 9 includes, and the log saving unit 2026 stores the log in the memory 22. In other words, on the basis of the log identification information in the definition file D1, the log saving unit 2026 identifies a log serving as a saving target, from among logs in the identified log file, and stores the log in the memory 22.

Step S16: The log saving unit 2026 saves (stores), in the storage device 24, the log (identified log) stored in the memory 22 in the step S15, as the saving log file 243. Specifically, the log saving unit 2026 creates a directory in which the saving log file is to be stored, immediately below a predetermined directory in the storage device 24. In addition, the log saving unit 2026 assigns, to the created directory, a time stamp indicating a creation time and date. In the created directory, the log saving unit 2026 stores, as the saving log file 243, the log serving as the saving target, stored in the memory 22 in the step S15.

Step S17: Through the output unit 203, the management unit 200 notifies the terminal device 3 for the administrator and the terminal device 4 for the user of the effect that an error has occurred.

First Specific Example Explaining Log Saving

A first specific example explaining log saving will be described with reference to FIG. 2 and FIG. 4 to FIG. 11. Before describing the first specific example, the storage device 24 has stored therein the log files described in FIG. 4 to FIG. 8 and stored the definition file described in FIG. 9.

When one hour has elapsed from a time when the processing for connecting to the business database 12 at the time and date of "2012-02-19 12:28" described in FIG. 6 was terminated, the collection unit 201 in FIG. 2 executes the processing for connecting to the business database 12 in the business system 1 again. However, for example, when the business database 12 does not operate or when there is a failure in the network NT connecting the business system 1 and the monitoring device 2 to each other, it is difficult to connect to the business database 12. In other words, a connection error has occurred that is due to the failure of connection processing in a process in which the collection unit 201 executes the connection processing (step S11).

The collection unit 201 generates a collection log including a connection time and date and connection information indicating that the connection processing has failed, and stores, in the memory 22, the collection log as the log data 221. The collection unit 201 generates a connection ID, and stores the connection ID in the memory 22 along with the collection log. As the connection time and date, there is, for example, "2012-02-19 13:28", and as the connection information, there is "connection to the business database has failed". As the connection ID, there is "CL020".

The log processing unit 2025 stores, in the storage device 24, a collection log existing in the memory 22, as the log file group 241. Specifically, as illustrated in the collection log file L1 in FIG. 4, the log processing unit 2025 stores, in the storage device 24 in a table form, the connection time and date, the connection ID, and the connection information, which are described above. In the above-mentioned example, the log processing unit 2025 stores, in the time and date field of the collection log file L1, "2012-02-19 13:28" as the connection time and date, and stores "CL020" in the ID field of the collection log file L1. The log processing unit 2025 stores, in the content field of the collection log file L1, "connection to the business database has failed" as the connection information.

As a result of the failure of the connection to the business database, the collection unit 201 also fails in collection processing for an uncollected event. Therefore, the collection unit 201 does not execute output processing for an event, on the reception unit 2022. As a result, the reception unit 2022 does not execute outputting of a reception log, the storage unit 2023 does not execute outputting of a storage log, and the totalization unit 2024 does not execute outputting of a totalization log. Therefore, logs in the reception log file L2 in FIG. 5, the storage log file L3 in FIG. 6, and the totalization log file L4 in FIG. 7 are not updated.

The log saving unit 2026 accesses the definition file 242 in the storage device 24 and the log data 221 in the memory 22 (step S12). Specifically, the log saving unit 2026 accesses the connection time and date of "2012-02-19 13:28", the connection information, "connection to the business database has failed", and the connection ID, "CL020", which correspond to the above-mentioned connection error log and are stored as a portion of the log data 221 in the memory 22.

The log saving unit 2026 determines whether the error matches the log saving condition the definition file D1 in FIG. 9 includes (step S13). Since the connection error where the connection to the business database 12 fails does not match the above-mentioned log saving condition ("one or more search errors have occurred" in the example of FIG. 9), NO is defined in the step S13. As a result, through the output unit 203, the management unit 200 notifies the terminal device 3 and the terminal device 4 of the effect that an error has occurred (step S17).

Next, while, at this point of time, storing therein an event collected at the time and date of "2012-02-19 12:28", the event database 25 does not store an event subsequent to the above-mentioned time and date. The event collected at the time and date of "2012-02-19 12:28" is, for example, that the quantity of stock of the stock commercial product name AAA in the shop X at the time and date of "2012-02-19 12:21" is 300. In other words, it is assumed that the event database 25 stores therein the quantity of stock of the stock commercial product name AAA in the shop X before the time and date of "2012-02-19 12:21". At this time, the user of the monitoring device 2 specifies, as a search condition, the quantity of stock of the stock commercial product name AAA in the shop X after the time and date of "2012-02-19 12:25", and transmits a search instruction message to the external interface 204 in the monitoring device 2. The external interface 204 transfers the search instruction message to the output unit 203 through the management unit 200. The output unit 203 receives the search instruction message, and outputs, to the search unit 2031, a search instruction including the search condition of the search instruction message. In response to the search instruction, the search unit 2031 connects to the event database 25, and executes processing for searching for an event matching the search condition, within a plurality of events the event database 25 stores therein.

Here, the search unit 2031 presumes that the connection to the event database 25 has succeeded. However, since the event database 25 does not store therein an event matching the above-mentioned search condition, the search unit 2031 presumes that the search processing for an event has failed, and outputs a search log indicating the effect.

Specifically, the search unit 2031 generates a search log including a connection time and date and connection information indicating the success of connection processing, and stores, in the memory 22, the search log as the log data 221. The search unit 2031 generates a connection ID, and stores the connection ID in the memory 22 along the search log. As the connection time and date, there is, for example, "2012-02-19 13:30", and as the connection information, there is "connection to the event database has succeeded". As the connection ID, there is "AM020".

The search unit 2031 generates a search log including a search time and date and search information indicating that the search processing has failed, and stores, in the memory 22, the search log as the log data 221. The search unit 2031 generates a search ID, and stores the search ID in the memory 22 along with the search log. As the search time and date, there is, for example, "2012-02-19 13:32", and as the search information, there is "search for an event within the event database has failed". As the search ID, there is "AM021".

The log processing unit 2025 stores, in the storage device 24, a search log existing in the memory 22, as the log file group 241. The log saving unit 2026 accesses the definition file 242 in the storage device 24 and the log data 221 in the memory 22 (step S12). Specifically, the log saving unit 2026 accesses the search time and date of "2012-02-19 13:32", the search information, "search for an event within the event database has failed", and the search ID, "AM021", which correspond to the above-mentioned event search error log and are stored as a portion of the log data 221 in the memory 22.

The log saving unit 2026 determines whether the error matches the log saving condition the definition file D1 in FIG. 9 includes (step S13). Since the search error where the event search fails matches the above-mentioned log saving condition ("one or more search errors have occurred" in the example of FIG. 9), YES is defined in the step S13.

The log saving unit 2026 reads, from the storage device 24, a log file identified by the log file identification information the definition file D1 in FIG. 9 includes (step S14). Specifically, the above-mentioned identified log files are the collection log file L1 in FIG. 4, the reception log file L2 in FIG. 5, the storage log file L3 in FIG. 6, the totalization log file L4 in FIG. 7, and the search log file L5 in FIG. 8. The log saving unit 2026 reads these log files (the collection log file L1 to the search log file L5) from the storage device 24. On the basis of the log identification information, the log saving unit 2026 identifies a log to be a saving target, from among these log files (the collection log file L1 to the search log file L5), and stores the log in the memory 22 (step S15).

The log identification information is a log within a time range ranging from 300 seconds before through 300 seconds after the occurrence time and date of an error as a base. Since, in the above-mentioned example, the search error occurrence time and date is "2012-02-19 13:32", the log saving unit 2026 identifies a log including a time and date within a range from "2012-02-19 13:27" to "2012-02-19 13:37". In the above-mentioned log files (the collection log file L1 to the search log file L5), the log saving unit 2026 identifies the content, "connection to the business database 12 has failed", of a log that includes the time and date of "2012-02-19 13:28" the time and date field of the collection log file L1 stores therein, and the log saving unit 2026 stores the log in the memory 22 (step S15). In storing in the memory 22, the log saving unit 2026 stores the time and date, "2012-02-19 13:28", and the search ID, "CL020", of the identified log so as to respond to the identified log (step S15).

Furthermore, the log saving unit 2026 identifies the content, "event connection to the event database has succeeded", of a log that includes the time and date of "2012-02-19 13:30" the time and date field of the search log file L5 in FIG. 8 stores therein, and the log saving unit 2026 stores the log in the memory 22 (step S15). In storing in the memory 22, the log saving unit 2026 stores the time and date, "2012-02-19 13:30", and the connection ID, "AM020", of the identified log so as to respond to the identified log (step S15). In addition, the log saving unit 2026 identifies the content, "search for an event within the event database has failed", of a log that includes the time and date of "2012-02-19 13:32" the time and date field of the search log file L5 stores therein, and the log saving unit 2026 stores the log in the memory 22 (step S15). In storing in the memory 22, the log saving unit 2026 stores the time and date, "2012-02-19 13:32", and the search ID, "AM021", of the identified log so as to respond to the identified log (step S15).

As illustrated in the saving log file 243 (refer to FIG. 10), the log saving unit 2026 stores, in the storage device 24 in a table form, the log stored in the memory 22 in the step S15 and the time and date and the ID of the stored log (step S16). The saving log file SL1 in FIG. 10 is an example of the saving log file 243.

Through the output unit 203, the management unit 200 notifies the terminal device 3 and the terminal device 4 of the effect that an error has occurred (step S17). The terminal device 3 and the terminal device 4 display-output the error given notice of, to a display device (not illustrated). Looking at the displayed content of the notification, the administrator of the monitoring device 2 recognizes that a search error has occurred, and analyzes an error cause. Through the terminal device 4, the administrator instructs the external interface 204 in the monitoring device 2 to acquire the saving log file 243. The external interface 204 acquires the saving log file 243 in the storage device 24, converts the saving log file 243 into, for example, a hypertext markup language (HTML) format, and transmit the saving log file 243 to the terminal device 3. The terminal device 3 receives and display-outputs the saving log file having the HTML format, to a display device (not illustrated). The display device display-outputs, for example, the saving log file SL1 in FIG. 10.

By referring to the saving log file SL1, the administrator may analyze the error cause to judge that search based on the above-mentioned specified search condition has failed as a result of the failure of the connection to the business database 12.

When an error has occurred that matches the log saving condition the definition file 242 includes, the log saving unit 2026 automatically extracts only a log corresponding to the log identification information, from a log file corresponding to the log file identification information, with the occurrence of the matching error as a trigger. In addition, the log saving unit 2026 has stored (saved) an extracted log file as the saving log file 243. In other words, the log saving unit 2026 has efficiently extracted and stored a log contributing to the analysis of an error cause, from among a large number of logs. In addition, since a log is extracted from among a plurality of log files in a cross-sectional manner, the above-mentioned extraction is also called federated extraction. Accordingly, at the time of the analysis of an error cause, the administrator may not analyze a large number of logs, and by analyzing the content of the saving log file 243, it may be possible for the administrator to analyze an error cause. As a result, it may be possible for the administrator to efficiently analyze an error cause.

In addition, as described above, since performing log storage of a cyclic method, in some case the log processing unit 2025 deletes, from a log file, a log file desired for the analysis of an error cause. However, since the log saving unit 2026 automatically extracts and stores therein a log contributing to the analysis of an error cause with timing when an error matching a saving condition has occurred, the above-mentioned log is not deleted. Therefore, even if a time from when an error occurs till when the administrator analyzes an error cause is long, it may be possible for the administrator to analyze an error cause, by referring to the content of the saving log file 243.

In addition, it may be possible for the administrator to freely change the content of the definition file for log saving. In other words, in response to an error content, it may be possible for the administrator to personally create a log saving condition, a log file to be a saving target, and a log to be a saving target, as the definition information for log saving.

Therefore, without having understood a dependency relationship between software modules (namely, components) in advance, it may be possible for the monitoring device to efficiently extract and store therein a log contributing to the analysis of an error cause. For example, in the example of FIG. 2, the above-mentioned dependency relationship between software modules means such an execution sequence relationship between the processing operations of the individual software modules that the processing operation of the processing unit 202 is executed after the processing operation of the collection unit 201 and the processing operation of the output unit 203 is executed after the processing operation of the processing unit 202.

Second Specific Example Explaining Log Saving

A second specific example explaining log saving will be described with reference to FIG. 2, FIG. 6, FIG. 9, and FIG. 12 to FIG. 17. When one hour has elapsed from a time when processing for connecting to the business database 12 at the time and date of "2012-02-19 12:28" described in FIG. 6 was terminated, the collection unit 201 in FIG. 2 executes the processing for connecting to the business database 12 in the business system 1 again.

FIG. 13 is a diagram illustrating another example of the collection log file. In a collection log file L11 in FIG. 13, the ID of an ID field and the log content of a content field, which correspond to the time and date, "2012-02-19 12:28", of the collection log file L1 in FIG. 4, are the same. FIG. 14 is a diagram illustrating another example of the reception log file. In a reception log file L12 in FIG. 14, the ID of an ID field and the log content of a content field, which correspond to the time and date, "2012-02-19 12:28", of the reception log file L2 in FIG. 5, are the same.

FIG. 15 is a diagram illustrating another example of the storage log file. In a storage log file L13 in FIG. 15, the ID of an ID field and the log content of a content field, which correspond to the time and date, "2012-02-19 12:28", of the storage log file L3 in FIG. 6, are the same. FIG. 16 is a diagram illustrating another example of the search log file. In a search log file L15 in FIG. 16, the IDs of an ID field and the log contents of a content field, which correspond to the times and dates, "2012-02-19 12:30" and "2012-02-19 12:32", of the search log file L5 in FIG. 8, are the same.

In the first specific example explaining the log saving, a connection error has occurs in a process in which the collection unit 201 executes the connection processing. In the second specific example, it is assumed that while no connection error has occurred, the collection unit 201 has succeeded in collecting an event, and the reception unit 2022 has succeeded in receiving the event, the storage unit 2023 has failed in storing the event in the event database 25.

The collection unit 201 in FIG. 2 connects to the business database 12 in the business system 1, and collects an uncollected event from the business database 12. The collection unit 201 generates a collection log including a connection time and date and connection information, and stores, in the memory 22, the collection log as the log data 221. The collection unit 201 generates a connection ID, and stores the connection ID in the memory 22 along with the collection log. As the connection time and date, there is, for example, "2012-02-19 13:28", and as the connection information, there is "connection to the business database has succeeded". As the connection ID, there is "CL020".

The collection unit 201 generates a collection log including a collection time and date and collection information, and stores, in the memory 22, the collection log as the log data 221. The collection unit 201 generates a collection ID, and stores the collection ID in the memory 22 along with the collection log. As the collection time and date, there is, for example, "2012-02-19 13:28", and as the collection information, there is "the collection of an event from the business database has succeeded". As the collection ID, there is "CL021".

In the storage device 24, the log processing unit 2025 stores a collection log existing in the memory 22, as the log file group 241. Specifically, as illustrated in the collection log file L11 in FIG. 13, the log processing unit 2025 stores, in the storage device 24 in a table form, the connection time and date, the connection ID, the connection information, the collection time and date, the collection ID, and the collection information, which are described above. In the above-mentioned example, the log processing unit 2025 stores, in the time and date field of the collection log file L11, "2012-02-19 13:28" as the connection time and date and the collection time and date, and stores, in the ID field of the collection log file L11, "CL020" as the connection ID and "CL021" as the collection ID. The log processing unit 2025 stores, in the content field of the collection log file L11, "connection to the business database has succeeded" as the connection information and "the collection of an event from the business database has succeeded" as the collection information.

In addition, the collection unit 201 in FIG. 2 outputs the collected event to the reception unit 2022. The reception unit 2022 receives the event input from the collection unit 201, and outputs the event to the storage unit 2023. The reception unit 2022 generates a reception log including a reception time and date and reception information, and stores, in the memory 22, the reception log as the log data 221. The reception unit 2022 generates a reception ID, and stores the reception ID in the memory 22 along with the reception log.

As the reception time and date, there is, for example, "2012-02-19 13:28", and as the reception information, there is "the reception of an event has succeeded". As the reception ID, there is "NT020".

The log processing unit 2025 stores, in the storage device 24, a reception log existing in the memory 22, as the log file group 241. Specifically, as illustrated in the reception log file L12 in FIG. 14, the log processing unit 2025 stores, in the storage device 24 in a table form, the reception time and date, the reception ID, and the reception information, which are described above. In the above-mentioned example, the log processing unit 2025 stores, in the time and date field of the reception log file L12, "2012-02-19 13:28" as the reception time and date, and stores, in the ID field of the reception log file L12, "NT020" as the reception ID. The log processing unit 2025 stores, in the content field of the reception log file L12, "the reception of an event has succeeded" as the reception information.

The storage unit 2023 executes processing for connecting to the event database 25. However, it is assumed that a failure occurs in the event database 25 and it is difficult for the storage unit 2023 to connect to the event database 25. In other words, a connection error has occurred that is due to the failure of connection processing in a process in which the storage unit 2023 executes the connection processing (step S11).

The storage unit 2023 generates a storage log including a connection time and date and connection information indicating that the connection processing has failed, and stores, in the memory 22, the storage log as the log data 221. The storage unit 2023 generates a connection ID, and stores the connection ID in the memory 22 along with the storage log. As the connection time and date, there is, for example, "2012-02-19 13:28", and as the connection information, there is "connection to the event database has failed". As the connection ID, there is "RG020".

The log processing unit 2025 stores, in the storage device 24, a storage log existing in the memory 22, as the log file group 241. Specifically, as illustrated in the storage log file L13 in FIG. 15, the log processing unit 2025 stores, in the storage device 24 in a table form, the connection time and date, the connection ID, and the connection information, which are described above. In the above-mentioned example, the log processing unit 2025 stores, in the time and date field of the storage log file L13, "2012-02-19 13:28" as the connection time and date, and stores, in the ID field of the storage log file L13, "RG020" as the storage ID. The log processing unit 2025 stores, in the content field of the storage log file L13, "connection to the event database has failed" as the connection information. Since the storage unit 2023 has failed in connecting to the event database 25, and as a result, after that, the totalization unit 2024 does not execute totalization processing, the totalization log file is in the state of the totalization log file L4 in FIG. 7.

The log saving unit 2026 accesses the definition file 242 in the storage device 24 and the log data 221 in the memory 22 (step S12). Specifically, the log saving unit 2026 accesses the connection time and date of "2012-02-19 13:28", the connection information, "connection to the event database has failed", and the connection ID, "RG020", which correspond to the above-mentioned connection error log and are stored as a portion of the log data 221 in the memory 22.

The log saving unit 2026 determines whether the error matches the log saving condition the definition file D1 in FIG. 9 includes (step S13). Since the connection error where the connection to the event database 25 fails does not match the above-mentioned log saving condition ("one or more search errors have occurred" in the example of FIG. 9), NO is defined in the step S13. As a result, through the output unit 203, the management unit 200 notifies the terminal device 3 and the terminal device 4 of the effect that an error has occurred (step S17).

Here, as described in the first specific example, in response to an event search instruction from the output unit 203, the search unit 2031 executes processing for connecting to the event database 25. At this point of time, owing to the occurrence of a failure, the event database 25 does not operate. Accordingly, it is difficult for the search unit 2031 to connect to the event database 25. Therefore, the search unit 2031 presumes that the search processing for an event has failed, and outputs a search log indicating the effect.

Specifically, the search unit 2031 generates a search log including a connection time and date and connection information indicating the failure of connection processing, and stores, in the memory 22, the search log as the log data 221. The search unit 2031 generates a connection ID, and stores the connection ID in the memory 22 along the search log. As the connection time and date, there is, for example, "2012-02-19 13:30", and as the connection information, there is "connection to the event database has failed". As the connection ID, there is "AM020".

Furthermore, the search unit 2031 generates a search log including a search time and date and search information indicating the failure of search processing, and stores, in the memory 22, the search log as the log data 221. The search unit 2031 generates a search ID, and stores the search ID in the memory 22 along the search log. As the search time and date, there is, for example, "2012-02-19 13:32", and as the search information, there is "search for an event within the event database has failed". As the search ID, there is "AM021".

The log processing unit 2025 stores, in the storage device 24, a search log existing in the memory 22, as the log file group 241. Specifically, as illustrated in the search log file L15 in FIG. 16, the log processing unit 2025 stores, in the storage device 24 in a table form, the connection time and date, the connection ID, the connection information, the search time and date, the search ID, and the search information, which are described above. In the above-mentioned example, the log processing unit 2025 stores, in the time and date field of the search log file L15, "2012-02-19 13:30" as the connection time and date and "2012-02-19 13:32" as the search time and date, and stores, in the ID field of the search log file L15, "AM020" as the connection ID and "AM021" as the search ID. The log processing unit 2025 stores, in the content field of the search log file L15, "connection to the event database has failed" as the connection information and "search for an event within the event database has failed" as the search information.

The log saving unit 2026 accesses the definition file 242 in the storage device 24 and the log data 221 in the memory 22 (step S12). Specifically, the log saving unit 2026 accesses the connection time and date of "2012-02-19 13:30", the connection information, "connection to the business database has failed", and the connection ID, "AM020", which correspond to the above-mentioned connection error log and are stored as a portion of the log data 221 in the memory 22. Furthermore, the log saving unit 2026 accesses the search time and date of "2012-02-19 13:32", the search information, "search for an event within the event database has failed", and the search ID, "AM021", which correspond to the above-mentioned search error log and are stored as a portion of the log data 221 in the memory 22.

The log saving unit 2026 determines whether the error matches the log saving condition the definition file D1 in FIG.

9 includes (step S13). Since the search error where the event search fails matches the above-mentioned log saving condition ("one or more search errors have occurred" in the example of FIG. 9), YES is defined in the step S13.

The log saving unit 2026 reads, from the storage device 24, a log file identified by the log file identification information the definition file D1 in FIG. 9 includes (step S14). Specifically, the above-mentioned identified log files are the collection log file L11 in FIG. 13, the reception log file L12 in FIG. 14, the storage log file L13 in FIG. 15, the totalization log file L4 in FIG. 7, and the search log file L15 in FIG. 16. The log saving unit 2026 reads these log files from the storage device 24. On the basis of the log identification information, the log saving unit 2026 identifies a log to be a saving target, from among these log files (the collection log file L11 to the search log file L15), and stores the log in the memory 22 (step S15).

The log identification information is a log within a time range ranging from 300 seconds before through 300 seconds after the occurrence time and date of an error as a base. Since, in the above-mentioned example, the search error occurrence time and date is "2012-02-19 13:32", the log saving unit 2026 identifies a log including a time and date within a range from "2012-02-19 13:27" to "2012-02-19 13:37". In the above-mentioned log files, the log saving unit 2026 identifies the content, "connection to the business database 12 has succeeded", of a log that includes the time and date of "2012-02-19 13:28" the time and date field of the collection log file L11 in FIG. 13 stores therein, and the log saving unit 2026 stores the log in the memory 22 (step S15). In storing in the memory 22, the log saving unit 2026 stores the time and date, "2012-02-19 13:28", and the connection ID, "CL020", of the identified log so as to respond to the identified log (step S15).

In the above-mentioned log file, the log saving unit 2026 identifies the content, "the acquisition of an event from the business database 12 has succeeded", of a log that includes the time and date of "2012-02-19 13:28" the time and date field of the collection log file L11 in FIG. 13 stores therein, and the log saving unit 2026 stores the log in the memory 22 (step S15). In storing in the memory 22, the log saving unit 2026 stores the time and date, "2012-02-19 13:28", and the acquisition ID, "CL021", of the identified log so as to respond to the identified log (step S15).

In the above-mentioned log file, the log saving unit 2026 identifies the content, "the reception of an event has succeeded", of a log that includes the time and date of "2012-02-19 13:28" the time and date field of the reception log file L12 in FIG. 14 stores therein, and the log saving unit 2026 stores the log in the memory 22 (step S15). In storing in the memory 22, the log saving unit 2026 stores the time and date, "2012-02-19 13:28", and the reception ID, "NT020", of the identified log so as to respond to the identified log (step S15).

In the above-mentioned log file, the log saving unit 2026 identifies the content, "connection to the event database has failed", of a log that includes the time and date of "2012-02-19 13:28" the time and date field of the storage log file L13 in FIG. 15 stores therein, and the log saving unit 2026 stores the log in the memory 22 (step S15). In storing in the memory 22, the log saving unit 2026 stores the time and date, "2012-02-19 13:28, and the connection ID, "RG020", of the identified log so as to respond to the identified log (step S15).

In the above-mentioned log file, the log saving unit 2026 identifies the content, "connection to the event database has failed", of a log that includes the time and date of "2012-02-19 13:30" the time and date field of the search log file L15 in FIG. 16 stores therein, and the log saving unit 2026 stores the log in the memory 22 (step S15). In storing in the memory 22, the log saving unit 2026 stores the time and date, "2012-02-19 13:30", and the connection ID, "AM020", of the identified log so as to respond to the identified log (step S15).

In the above-mentioned log file, the log saving unit 2026 identifies the content, "search for an event within the event database has failed", of a log that includes the time and date of "2012-02-19 13:32" the time and date field of the search log file L15 in FIG. 16 stores therein, and the log saving unit 2026 stores the log in the memory 22 (step S15). In storing in the memory 22, the log saving unit 2026 stores the time and date, "2012-02-19 13:32", and the search ID, "AM021", of the identified log so as to respond to the identified log (step S15).

As illustrated in the saving log file 243 (refer to FIG. 2), the log saving unit 2026 stores, in the storage device 24 in a table form, the log stored in the memory 22 in the step S15 and the time and date and the ID of the stored log (step S16). A saving log file SL11 in FIG. 17 is an example of the saving log file 243 in the second specific example.

Through the output unit 203, the management unit 200 notifies the terminal device 3 and the terminal device 4 of the effect that an error has occurred (step S17). The terminal device 3 and the terminal device 4 display-output the error given notice of, to a display device (not illustrated). Looking at the displayed content of the notification, the administrator of the monitoring device 2 recognizes that a search error has occurred, and analyzes an error cause.

As described in the first specific example, the administrator refers to the saving log file SL11. By referring to the saving log file SL11, the administrator may analyze the error cause to judge that search based on the above-mentioned specified search condition has failed as a result of the failure of the connection to the event database 25.

Third Specific Example Explaining Log Saving

FIG. 18 is a diagram illustrating another example of the definition file in FIG. 2. A definition file D11 in FIG. 18 corresponds to a definition file where the log saving condition of the definition file D1 in FIG. 9 is set to a character string, "{[STATISTICS_ERROR]=>1}". Furthermore, the definition file D11 in FIG. 18 corresponds to a definition file where the fifth file character string, "${BPMA_HOME}/log/activitymonitor.log", is deleted from the log file identification information of the definition file D1 in FIG. 9.

By operating the terminal device 3, the administrator creates the definition file D11 in FIG. 18, and transmits the definition file D11 to the monitoring device 2. The external interface 204 in the monitoring device 2 receives the definition file D11 in FIG. 18, and stores, in the storage device 24, the definition file D11 as the definition file 242. It is assumed that, at this time, the storage device 24 has also stored the definition file D1 in FIG. 9.

The log saving condition, {[STATISTICS_ERROR]=>1}, indicates that a log identified by the log file identification information and the log identification information is saved as the saving log file 243 when an acquisition error or one or more totalization errors have occurred in the totalization unit 2024.

When an acquisition error or a totalization error has occurred in the totalization unit 2024, in other words, when the totalization unit 2024 has output, as the content of a log, "the acquisition of an event from the event database has failed" or "totalization processing has failed", the log saving unit 2026 executes the following processing. In other words, from the collection log file, the reception log file, the storage log file, or the totalization log file, the log saving unit 2026 extracts a log within a time range ranging from 300 seconds before through 300 seconds after the occurrence time and date of the acquisition error or totalization error as a base, and the log saving unit 2026 saves the log as the saving log file 243.

In this way, it may be possible for the administrator to freely change the content of a definition file for log saving. Therefore, in response to the content of an error, it may be possible for the administrator to freely define a log (that is to say, a log desired to be saved) desired for the analysis of an error cause. As a result, when an error has occurred, the monitoring device automatically saves a log according to the content of the definition file. This saved log is a log desired for the analysis of an error cause. Therefore, the administrator may only analyze a log desired for the analysis of an error cause, and may efficiently analyze an error cause.

While, so far, in the present embodiment, the log saving processing in the monitoring device has described, the log saving processing in the present embodiment may also be applied to an information processing apparatus that sequentially executes a plurality of processing operations and outputs logs indicating the histories of the processing operations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a processor configured to execute a first processing operation and a second processing operation, the second processing operation being executed after the first processing operation; and
    a storage coupled to the processor and including a first storage area, a second storage area, a third storage area, and a fourth storage area, the first storage area storing first history information indicating histories of the first processing operation, the second storage area storing second history information indicating histories of the second processing operation, and the third storage area storing association information that indicates that the first history information stored in the first storage area is to be duplicated into the fourth storage area when a failure is detected in the first processing operation, and that both of the first history information stored in the first storage area and the second history information stored in the second storage area are to be duplicated into the fourth storage area when a failure is detected in the second processing operation, wherein
    and the processor is configured to
        detect a failure that occurred in the first processing operation,
        select, by referring to the association information, the first storage area,
        duplicate, into the fourth storage area, the first history information stored in the first storage area when the failure that occurred in the first processing operation is detected,
        detect a failure that occurred in the second processing operation,
        select, by referring to the association information, both of the first storage area and the second storage area, and
        duplicate, into the fourth storage area, both of the first history information stored in the first storage area and the second history information stored in the second storage area when the failure that occurred in the second processing operation is detected.

2. The information processing apparatus according to claim 1, wherein
    the association information includes a condition for duplicating history information,
    wherein the processor is configured to duplicate, in the fourth storage, the history information when a content of the failure having occurred matches the condition.

3. The information processing apparatus according to claim 1, wherein
    the processor is configured to execute the second processing operation using a processing result of the first processing operation.

4. The information processing apparatus according to claim 3, wherein
    the first processing operation includes a processing operation for collecting a unit data of business data processed by a business system executing business processing, a processing operation for receiving the collected unit data, and a processing operation for storing the unit data in a storage mechanism and creating a database.

5. The information processing apparatus according to claim 4, wherein
    the second processing operation includes a processing operation for searching for the unit data within the database.

6. The information processing apparatus according to claim 1, wherein
    the first processing operation includes a processing operation for collecting a unit data of business data processed by a business system executing business processing, a processing operation for storing the unit data in a storage mechanism and creating a database, and a processing operation for monitoring the unit data of the database.

7. The information processing apparatus according to claim 1, wherein
    the processor is configured to delete the oldest history information within the first storage area storing therein the first history information exceeding a first predetermined amount when an information amount of the history information the storage area stores therein has exceeded the first predetermined amount, and to delete the oldest history information within the second storage area storing therein the second history information exceeding a second predetermined amount when an information amount of the second history information the storage area stores therein has exceeded the second predetermined amount.

8. The information processing apparatus according to claim 1, wherein the processor is configured to:
    receive, from an external device, the association information created by an administrator of the information processing apparatus using the external device, and
    store the received association information in the third storage area.

9. A non-transitory computer-readable recording medium storing a program causing an information processing apparatus to execute a process, the process comprising:

executing a first processing operation and a second processing operation, the second processing operation being executed after the first processing operation;

storing, in a first storage area, first history information indicating histories of the first processing operation;

storing, in a second storage area, second history information indicating histories of the second processing operation;

storing, in a third storage area, association information that indicates that the first history information stored in the first storage area is to be duplicated into a fourth storage area when a failure is detected in the first processing operation, and that indicates that both of the first history information stored in the first storage area and the second history information stored in the second storage area are to be duplicated into the fourth storage area when a failure is detected in the second processing operation;

detecting a failure that occurred in the first processing operation;

selecting, by referring to the association information, the first storage area and duplicating, into the fourth storage area, the first history information stored in the first storage area when the failure that occurred in the first processing operation is detected;

detecting a failure that occurred in the second processing operation; and selecting, by referring to the association information, both of the first storage area and the second storage area, and duplicating, into the fourth storage area, both of the first history information stored in the first storage area and the second history information stored in the second storage area when the failure that occurred in the second processing operation is detected.

10. An information processing method executed in an information processing apparatus, the information processing method comprising:

executing a first processing operation and a second processing operation, the second processing operation being executed after the first processing operation;

storing, in a first storage area, first history information indicating histories of the first processing operation;

storing, in a second storage area, second history information indicating histories of the second processing operation;

storing, in a third storage area, association information that indicates that the first history information stored in the first storage area is to be duplicated into a fourth storage area when a failure is detected in the first processing operation, and that indicates that both of the first history information stored in the first storage area and the second history information stored in the second storage area are to be duplicated into the fourth storage area when a failure is detected in the second processing operation;

detecting a failure that occurred in the first processing operation;

selecting, by referring to the association information, the first storage area and duplicating, into the fourth storage area, the first history information stored in the first storage area when the failure that occurred in the first processing operation is detected;

detecting a failure that occurred in the second processing operation; and selecting, by referring to the association information, both of the first storage area and the second storage area, and duplicating, into the fourth storage area, both of the first history information stored in the first storage area and the second history information stored in the second storage area when the failure that occurred in the second processing operation is detected.

11. The information processing method according to claim 10, wherein
the association information include a condition for duplicating history information,
wherein the duplicating duplicates in the fourth storage, the history information when a content of the failure having occurred matches the condition.

12. The information processing method according to claim 10, wherein
the second processing operation is executed using a processing result of the first processing operation.

13. The information processing method according to claim 12, wherein
the first processing operation includes a processing operation for collecting a unit data of business data processed by a business system executing business processing, a processing operation for receiving the collected unit data, and a processing operation for storing the unit data in a storage mechanism and creating a database.

14. The information processing method according to claim 13, wherein
the second processing operation includes a processing operation for searching for the unit data within the database.

15. The information processing method according to claim 10, wherein
the first processing operation includes a processing operation for collecting a unit data of business data processed by a business system executing business processing, a processing operation for storing the unit data in a storage mechanism and creating a database, and a processing operation for monitoring the unit data of the database.

16. The information processing method according to claim 10, further comprising:
deleting the oldest history information within the first storage area storing therein the first history information exceeding a first predetermined amount when an information amount of the history information the storage area stores therein has exceeded the first predetermined amount, and deleting the oldest history information within the second storage area storing therein the second history information exceeding a second predetermined amount when an information amount of the second history information the storage area stores therein has exceeded the second predetermined amount.

17. The information processing method according to claim 10, further comprising:
receiving, from an external device, the association information created by an administrator of the information processing apparatus using the external device, and
storing the received association information in the third storage area.

* * * * *